(12) United States Patent
Wirola et al.

(10) Patent No.: US 8,498,636 B2
(45) Date of Patent: Jul. 30, 2013

(54) STATE-MACHINE-BASED OPERATION OF A COVERAGE-MODEL-RELATED PROCESS

(75) Inventors: Lauri Aarne Johannes Wirola, Tampere (FI); Tommi Antero Laine, Tampere (FI); Matti Samuli Raitoharju, Tampere (FI); Niilo Torsten Sirola, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/202,603

(22) PCT Filed: Mar. 4, 2009

(86) PCT No.: PCT/US2009/001415
§ 371 (c)(1),
(2), (4) Date: Aug. 22, 2011

(87) PCT Pub. No.: WO2010/101547
PCT Pub. Date: Sep. 10, 2010

(65) Prior Publication Data
US 2011/0306337 A1    Dec. 15, 2011

(51) Int. Cl.
*H04W 24/00* (2009.01)
(52) U.S. Cl.
USPC .......................................... 455/423

(58) Field of Classification Search
USPC ............... 455/456.5, 456.1, 434, 411, 456.2, 455/456.3, 442, 446, 456.6, 423; 370/331, 370/338, 241, 329, 334, 222, 252, 337; 342/457, 342/451, 450
See application file for complete search history.

(56) References Cited

U.S. PATENT DOCUMENTS

| | | | |
|---|---|---|---|
| 2003/0235164 A1* | 12/2003 | Rogers et al. ................. | 370/331 |
| 2006/0112387 A1* | 5/2006 | Butt et al. ..................... | 717/177 |
| 2008/0055158 A1* | 3/2008 | Smith et al. ................... | 342/464 |
| 2008/0125140 A1* | 5/2008 | Udani ......................... | 455/456.1 |
| 2008/0133126 A1 | 6/2008 | Dupray | |
| 2008/0139222 A1* | 6/2008 | Falvo et al. ................. | 455/456.3 |
| 2008/0167049 A1 | 7/2008 | Karr et al. | |
| 2008/0214213 A1* | 9/2008 | Etemad et al. ............. | 455/456.6 |
| 2008/0285530 A1* | 11/2008 | Dietrich et al. ............... | 370/338 |
| 2009/0005972 A1 | 1/2009 | De Koning | |
| 2010/0130232 A1* | 5/2010 | Dingler et al. ............. | 455/456.3 |

OTHER PUBLICATIONS

U.S. Appl. No. 13/202,591, filed Aug. 22, 2011, Lauri Wirola.
U.S. Appl. No. 13/202,609, filed Aug. 22, 2011, Lauri Wirola.
U.S. Appl. No. 13/202,595, filed Aug. 22, 2011, Lauri Wirola.
U.S. Appl. No. 13/254,271, filed Sep. 1, 2011, Lauri Wirola.

* cited by examiner

Primary Examiner — Kiet Doan
(74) Attorney, Agent, or Firm — Locke Lord LLP

(57) ABSTRACT

It is disclosed to operate a generating/updating process that comprises generating and/or updating at least one model for a coverage area of a communication node and/or at least one process associated with said generating/updating process in dependence on at least one state of a state machine.

26 Claims, 12 Drawing Sheets

STATE-MACHINE-BASED OPERATION OF A COVERAGE-MODEL-RELATED PROCESS

THE NAMES OF THE PARTIES TO A JOINT RESEARCH AGREEMENT

The claimed invention was made by or on behalf of Tampere University of Tampere, Finland and Nokia Corporation of Espoo, Finland as parties to a joint research agreement that was in effect on or before the date the claimed invention was made.

FIELD

This invention relates to operating at least one coverage-model-related process according to a state machine.

BACKGROUND

As an alternative or add-on to satellite-based positioning systems, positioning systems in which a present position of a terminal is estimated based on a list of communication nodes (such as for instance cellular base stations, access points or beacons) that can presently be heard by the terminal and a database that contains identifiers and positions of the communication nodes and/or models for the coverage areas for a number of communication nodes have gained recent interest.

Given that the positions of the heard communication node are known and distances from the terminal to the heard communication nodes can be estimated, the terminal's position can be estimated through triangulation. The distance between a terminal and a communication nodes may for instance be estimated based on the path loss (i.e. how much the signal attenuates between the terminal and the communication node) using a channel model or on timing (or round-trip timing) measurements (i.e. information expressing how long signals propagate between terminal and communication node).

Alternatively, if models for the communication node coverage areas are known, then a terminal may pick the coverage areas for the heard communication nodes and find the intersection of these coverage areas. The terminal can then be assigned a position that is, for instance, the center-of-mass of the intersection area. Similarly an error estimate may be given based on the size of the intersection.

A model for the coverage area of a communication node can for instance be determined by having one or more terminals that are capable of determining their position send reports with their present position and a list of communication nodes that can presently be heard, gathering, for each communication node, the terminal positions reported into a set of terminal positions and deriving, from this set of terminal positions, a model for the coverage area of the communication node.

SUMMARY OF SOME EXEMPLARY EMBODIMENTS OF THE INVENTION

With increasing numbers of reporting terminals and increasing frequency of reporting, a huge amount of reports may have to be quickly stored and/or processed when generating/updating one or more models for the coverage area of a communication node (or one or more models for the coverage areas of several communication nodes). Therein, not all reports may be equally significant for this generating/updating.

Furthermore, the amount and type of reports actually required for generating/updating a model for the coverage area of a communication node may change during the generating/updating, as may the reliability and actuality of the models produced by the generating/updating.

According to a first aspect of the present invention, a method is disclosed, comprising operating a generating/updating process that comprises generating and/or updating at least one model for a coverage area of a communication node and/or at least one process associated with the generating/updating process in dependence on at least one state of a state machine.

According to a second aspect of the present invention, further an apparatus is disclosed, comprising a processor configured to operate a generating/updating process that comprises generating and/or updating at least one model for a coverage area of a communication node and/or at least one process associated with the generating/updating process in dependence on at least one state of a state machine.

The processor may for instance be implemented in hardware alone, may have certain aspects in software alone, or may be a combination of hardware and software. An exemplary embodiment of the processor may comprise a memory, wherein instructions executed by the processor may be transferrable to the memory and/or contained in the memory. Said memory may for instance store a program according to the fourth aspect of the present invention described below, or at least parts thereof.

According to a third aspect of the present invention, furthermore an apparatus is disclosed, comprising means for operating a generating/updating process that comprises generating and/or updating at least one model for a coverage area of a communication node and/or at least one process associated with the generating/updating process in dependence on at least one state of a state machine.

An example for the means for operating the generating/updating process or the at least one associated process is a processor configured to operate the generating/updating process or the at least one associated process, but the means is not limited thereto.

The apparatuses according to the second and third aspect of the present invention may for instance comprise a user interface, a memory and/or IP connectivity. An example for such apparatuses is a server or a part thereof, for instance a server in a system that collects positions reported from terminals and/or generates/updates models for the coverage areas of communication nodes, wherein such models may be provided to terminals to enable them to perform fingerprint-based positioning. Equally well, said apparatuses may be terminals or parts thereof, for instance terminals that collect position information and/or terminals that receive models to be enabled to perform fingerprint-based positioning.

According to a fourth aspect of the present invention, further a program is disclosed, comprising program code for performing the method according to the first aspect of the present invention and all exemplary embodiments (described below) thereof, when the program is executed on a processor.

The program may for instance be distributed via a network, such as for instance the Internet. The program may for instance be stored or encoded on a readable-medium, for instance a computer-readable or processor-readable medium. The readable medium may for instance be embodied as an electric, magnetic, electro-magnetic, optic or other storage medium, and may either be a removable medium or a medium that is fixedly installed in an apparatus or device. The readable medium may for instance be a tangible medium, for instance a tangible storage medium.

According to the present invention, the communication node for which a coverage area model is generated/updated by the generating/updating process may for instance be a communication node of a communication system. It may then for instance provide coverage for one or more terminals. The communication system may be a wireless or a wire-bound communication system, and may be of cellular or non-cellular type. The communication node may for instance be a one-directional or two-directional communication node. Non-limiting examples of the communication node as understood in this specification are thus a cellular base station, a Wireless Local Area Network (WLAN) access point, a Bluetooth station, an FM radio station, and a TV station. The communication node may be fixed or mobile, for instance with low mobility and/or velocity. In case of sectorization of cells, each sector may also be understood as a communication node, even if all sectors are controlled by the same (cellular) base station.

The communication node has a coverage area, which may be understood as an area within which (fixed or mobile) terminals are able to receive signals sent from the communication node at least with a pre-determined minimum quality, wherein the quality may for instance be expressed in terms of signal strength or signal-to-noise-ratio, to name but a few examples. In case of a wireless communication node, the coverage area may for instance depend on the transmission frequency and the propagation environment, which may for instance cause shadowing. The coverage area does not necessarily have to be continuous, it may equally well have recesses and may equally well consist of several sub-areas.

The generating/updating process comprises generating and/or updating at least one model for the coverage area of the communication node. This process may for instance generate/update one or more models for the coverage area of the communication node based on a collection of reports from one or more terminals that report their position (and optionally further information) and a list of one or more communication nodes (for instance a list of their identifiers) that can be heard at that position. Therein, a terminal may for instance be considered to "hear" a communication node if it is able to receive one or more signals, which are sent by the communication node, with a pre-defined minimum quality, wherein said quality may for instance be defined in terms of a signal-to-noise ratio or a signal-to-noise and interference ratio. An example of such a signal sent by a communication node may for instance be a broadcast channel. As an alternative, said terminal may for instance be considered to "hear" a communication node if the terminal is capable of at least partially receiving and correctly decoding one or more signals sent by the communication node, such as a broadcast channel. For instance, the terminal may be considered to "hear" the communication node if it is at least able to decode an identification of the communication node (e.g. a MAC address or any other type of communication node identification). The information which communication nodes a terminal can hear may for instance result from a scanning/sniffing operation performed by the terminal.

From such reports, a base-station-specific list of terminal positions may be derived, and a model for the coverage area of each communication node may then for instance be obtained by generating a geometrical object (such as an ellipse, a rectangle, a polygon, a circle, etc.) that is representative of (e.g. covers) all base-station-specific terminal positions. Therein, said geometrical model may for instance be a hard boundary for the terminal positions, so that all terminal positions have to be within the geometrical object. Equally well, the geometrical object may be a soft statistical boundary that is for instance based on a statistical model for the distribution of the terminal positions in the coverage area and is characterized by further parameters such as for instance a confidence value. The geometrical object may then be considered to be representative of all base-station-specific terminal positions even if it does not enclose all of these terminal positions.

The model (for instance its parameters and optional further parameters) may then be provided (optionally together with corresponding models for coverage areas of further communication nodes) to one or more terminals to enable them to perform positioning (i.e. position finding). In addition to such a model, further models for the coverage area of the communication node may be determined based on the base-station-specific terminal positions, for instance simpler models (e.g. models that require less memory to be stored and/or less bandwidth to be transmitted) and/or models that allow for less complex manipulation (for instance less complex checking if a position is covered by a model).

There may be at least one process associated with the generating/updating process, which will be referred to as associated process in the following. Such an associated process may for instance be related to generation and/or updating of the at least one model for the coverage area of the communication node. Non-limiting examples of such a process are a determining process that may for instance filter information useable by the generating/updating process and an information providing process that may for instance be deployed at a terminal to decide if information (such as a position of the terminal) shall be provided to the generating/updating process or not.

Therein, the generating and/or updating process may be performed by the same unit that performs the at least one associated process, or by another unit.

The state machine may for instance be a finite state machine. The state machine may be defined by a set of states it can assume and by a regulation between which of the states transitions are possible and which events trigger such transitions.

The state machine may for instance be operated by a unit that also implements the generating/updating process, or by another unit. The state machine may for instance be operated by a unit that also implements the at least one associated process, or by another unit. The generating/updating process, the at least one associated process and the state machine may equally well all be implemented by the same unit, or may all be implemented by different units.

The generating/updating process and/or the at least one associated process are operated in dependence on at least one state of the state machine. This may require that the generating/updating process and/or the at least one associated process are influenced by at least one state of the state machine. For instance, for at least two different states of the state machine, the process (i.e. the generating/updating process and/or the at least one associated process) may at least partially comprise different actions.

Therein, the operation of the respective process (i.e. the generating/updating process and/or the at least one associated process) in dependence on the state machine may for instance be performed by the unit that implements the respective process.

In exemplary embodiments of the present invention, operating the generating/updating process and/or the at least one associated process in dependence on at least one state of a state machine allows adapting the generating/updating process and/or the at least one associated process to the states of the state machine, so that the generating/updating process and/or the at least one associated process are dynamic rather than static. This may for instance contribute to taking time-variant information needs of the generating/updating process into account in the generating/updating process itself and/or in the at least one associated process (for instance in a pre-filtering process that filters information useable by the generating/updating process).

The state machine may for instance be associated with at least one model of the at least one model for the coverage area of the communication node.

According to exemplary embodiments of all aspects of the present invention, at least one state of the state machine is associated with (for instance corresponds to) a state of at least one of the at least one model for the coverage area of the communication node generated and/or updated by the generating/updating process. This model will be referred to as state-machine-associated model in the following. Equally well, more than one (for instance all) states of the state machine may be associated with respective states of the state-machine-associated model. For instance, at least two different states of the state machine may be associated with two different respective states of the state-machine-associated model or of a model that is derived from the state-machine associated model.

The state-machine-associated model may for instance be a polygonal, elliptical or rectangular model for the coverage area of the communication node. It may for instance be a model that is used to represent positions of terminals within the generating/updating process and serves as a basis for some or all models generated/updated by the generating/updating process, or a model that is to be provided to at least one terminal to enable the terminal to perform positioning (i.e. position finding).

The states of the state-machine-associated model may for instance be related to the generating/updating process. Non-limiting examples of states of the state-machine-associated model are initial, maturing, stable, dubious and ghost, wherein the specific names associated with these states are arbitrary and only serves the purpose of being able to differentiate these states in the following description. Therein, in the initial state, for instance no model (or at least not the state-machine-associated model) for the coverage area of the communication node may have been generated or may have been successfully generated so far. In the maturing state, for instance the state-machine-associated model may have been already generated (or a representation of the state-machine-associated model may have been successfully generated), but may not be considered to be complete. In the stable state, for instance the state-machine-associated model may have already been generated and may be considered to be complete. In the dubious state, for instance the state-machine-associated model may have already been generated, but may be considered to be potentially wrong. In the ghost state, for instance the state-machine-associated model may have already been generated, but may be considered to be outdated, or it may not have been possible to generate a model (or at least not the state-machine-associated model) at all due to lack of reports.

Associating the states of the state machine with states of the state-machine-associated model for the coverage area then may advantageously allow adapting the operating of the generating/updating process and/or the at least one associated process to the (current) state of the state-machine-associated model, so that the generating/updating process and/or the at least one associated process may be deployed more targeted and/or efficiently.

According to an exemplary embodiment of all aspects of the present invention, at least two different states of the state machine are associated with different respective information needs of the generating/updating process. The generating/updating process and/or the at least one associated process then may at least partially be operated in dependence on the information needs of the generating/updating process. The information may for instance be information that is useable in the generating/updating process, and may for instance at least comprise a position of a terminal within the coverage area of the communication node, or information representative of such a terminal position. The information need may for instance be characterized by an amount and/or type of information required. Definition of a type of information may for instance be based on one or more criteria the information has to fulfill to be considered to be of this type. These criteria may for instance be based on one or more models for the coverage area of the communication node.

For instance, in an initial state, the generating/updating process may require any information related to the at least one model for the coverage area of the communication node to allow generation of a model for the coverage area as soon as possible. As a further example, in a stable state, only few and/or specific information, for instance information allowing checking if the coverage area has changed, is required by the generating/updating process.

It may be the case that all states of the state machine represent different respective information needs, but equally well, some states of the state machine may represent similar or even the same information needs. For instance, an information need in an initial state and ghost state may be similar or even the same. Similarly, an information need in a maturing state and a dubious state might be similar or even the same.

According to exemplary embodiments of all aspects of the present invention, transitions between at least two states of the state machine are triggered by events related to at least one property of at least one of the at least one model for the coverage area of the communication node. Therein, the at least one of the at least one model for the coverage area of the communication node may for instance be the state-machine-associated model introduced above, but may equally well be a different model or a different representation of the state-machine-associated model.

The at least one property may for instance be one of an availability, a consistency, a stability, a lack of reliability and a lack of actuality of the at least one model for the coverage area of the communication node. For instance, a transition may be triggered when at least one model becomes available, or when at least one model is considered to be consistent or stable or when at least one model is considered to be unreliable.

Non-limiting examples of state transitions within the context of the exemplary states of the state-machine-associated model introduced above are as follows. The maturing state may for instance be entered as soon as a first (valid) model (e.g. the state-machine-associated model or a representation thereof) has been produced and thus is available and may be maintained until no further changes occur in the model for a pre-defined period of time, in which case a transition to the stable state may then occur, since the model is considered stable. The dubious state may for instance be entered when potential outliers with respect to the coverage area occur, so that reliability of the model becomes questionable, and may be maintained until a model for the coverage area fulfills one or more pre-defined criteria (for instance consistency criteria). Therein, an outlier may for instance be defined as a terminal position that is too far apart from the coverage area of the communication node, for instance since it has a distance with respect to the coverage area that is above a distance threshold. An outlier may for instance occur when a terminal that is actually within the coverage area measures or reports its position erroneously. A position may be classified as a potential outlier if it is considered to be too far apart from the assumed coverage area of the communication node, for instance since it has a distance with respect to the assumed coverage area that is above a distance threshold, wherein the assumed coverage area of the communication node may for instance be represented by a model for said coverage area. The ghost state may be entered when an already determined model (e.g. the state-machine-associated model) is considered to lack actuality, for instance because it is not confirmed by any information received, or if it is not possible to generate a model for the coverage area of the communication node (e.g. at least the state-machine-associated model) at all due to lack of information.

According to exemplary embodiments of all aspects of the present invention, transitions between at least two states of the state machine are controlled by at least one of a monitoring process that monitors at least one of a stability and an actuality of at least one of the at least one model for the coverage area of the communication node, an outlier detection process that detects potential outliers with respect to the coverage area of the communication node and the generating/updating process. The monitoring process and/or the outlier detection process and/or the generating/updating process may for instance issue events that trigger the state transitions. The at least one of the at least one models may for instance be the state-machine-associated model introduced above, but may equally well be a different model. The outlier detection process may for instance be a part of the generating/updating process. The outlier detection process may for instance determine whether a position contained in information useable in the generating/updating process is to be considered as a potential outlier or not. This determining may for instance be based on at least one of the at least one model produced by the generating/updating process, or on pre-defined information such as an assumed maximum radius of a coverage area.

According to exemplary embodiments of all aspects of the present invention, at least the generating/updating process is operated in dependence on at least one state of the state machine, and wherein in the at least one state of the state machine, generating and/or updating of at least one model of the at least one model for the coverage area of the communication node is suspended. The at least one state may for instance be a state in which the coverage area is considered to be changing (e.g. a dubious state), and in which generating/updating of a model for the coverage area of the communication node that is to be provided to terminals to enable them to perform positioning (i.e. position finding) is suspended until further evidence of changes is gathered and the state changes to, for instance, maturing again.

According to exemplary embodiments of all aspects of the present invention, at least one of the at least one process associated with the generating/updating process is an information providing process of providing information useable in the generating/updating process, and at least the information providing process is operated in dependence on at least one state of the state machine. The information providing process may for instance be implemented by a terminal that determines its position and reports this position together with a list of one or more identifiers of communication nodes currently heard to a server. This reporting of a terminal position and the one or more communication node identifiers may be considered as providing information useable in the generating/updating process, and this process may be operated in dependence on the state machine by, for instance, refraining from reporting information in a certain state of the state machine, or adapting an amount of information provided according to a current state of the state machine.

According to exemplary embodiments of all aspects of the present invention, at least one of the at least one process associated with the generating/updating process is a position determining process capable of determining a position of a terminal based on at least one of the at least one model generated and/or updated by the generating/updating process, and at least the position determining process is operated in dependence on at least one state of the state machine.

The position determining process may for instance be a fingerprint-based positioning process. The position determining process may for instance be performed by a terminal to determine its position based on one or more models for the coverage areas of one or more communication nodes. The position determining process may for instance comprise determining which communication nodes can be heard by the terminal, and determining a position based on models for the coverage areas of those communication nodes that have been determined to be heard. This position determining process may replace or complement a satellite-based position determining process, such as for instance GNSS, and may for instance be advantageous in areas where the satellite-based position determining process does not work properly. The position determining process is associated with the generating/updating process since the position determining process is capable of determining a position of a terminal based on at least one of the at least one model generated and/or updated by the generating/updating process. The position determining process is operated in dependence on at least one state of the state machine. For instance, in at least one state of the state machine (for instance a dubious state), the at least one model for the coverage area of the communication node generated and/or updated by the generating/updating process may not be considered in the position determining process, since reliability of this model is currently questionable.

According to exemplary embodiments of all aspects of the present invention, at least one of the at least one process associated with the generating/updating process is a monitoring process that monitors at least one of a stability and an actuality of at least one of the at least one model for the coverage area of the communication node, and at least the monitoring process is operated in dependence on at least one state of the state machine. The monitored model may for instance be the state-machine-associated model or a representation thereof. The monitoring process may for instance monitor if the at least one of the at least one model for the coverage area of the communication node or at least parts thereof are up-to-date (i.e. not outdated), and may take measures to ensure that, in case of outdated parts or an outdated entire model, either the outdated parts or the entire outdated model is removed. Apart from this monitoring of the actuality of the at least one of the at least one model, also the stability of this model may be monitored, for instance based on the necessity and/or frequency of removal of outdated parts or the entire model. For instance, a model may be considered to be stable if no parts thereof have been removed in a pre-defined duration of time. The at least one of the at least one model may for instance be a polygonal model for the coverage area. The monitoring process may then for instance check if one or more (e.g. all) the vertices of the polygon are outdated or not, and may remove outdated vertices. In case that stability and/or actuality of a polygonal model of the coverage area of the communication node is monitored, the monitoring process may comprise setting up monitor areas (for instance rectangular monitor boxes) around the vertices of the polygonal model and checking if, within a pre-defined time interval, information with a position is received that falls within one of the monitor areas, in which case the vertex around which the monitor area is set up is considered to be up-to-date (i.e. not outdated). Said monitoring process may also trigger one or more transitions between states of the state machine.

According to exemplary embodiments of all aspects of the present invention, at least one of the at least one process associated with the generating/updating process is a determining process comprising determining whether information useable for the generating/updating process shall be discarded or made available to the generating/updating process, and wherein at least the determining process is operated in dependence on at least one state of state machine.

The determining process may for instance be implemented by a (pre-processing/pre-filtering) unit that receives the information (for instance in the form of fingerprints or reports) and either discards or makes the information available to the generating/updating process, for instance to reduce an amount of information that has to be processed by the generating/updating process.

The information may for instance be made available to the generating/updating process by storing this information to a storage unit where it can be retrieved by the generating/updating process, or by directly forwarding this information to the generating/updating process, to name but a few examples.

Since only non-discarded information is made available to the generating/updating process, an amount of information that has to be dealt with by the generating/updating process may be vastly reduced, depending on the criteria applied in the determining process. For instance, only information that is considered to be of significance for the generating/updating process may be determined to be made available for the generating/updating process.

The determining may for instance be based on determination rules, and for at least two different states of the state machine, different respective determination rules may be applied in the determining process.

The determination rules may for instance define in which cases information shall be discarded and in which cases information shall be made available to the generating/updating process. The determination rules may for instance be based on one or more models for the coverage area of the communication node that have been generated/updated so far (for instance by the generating/updating process) to allow discarding of information that is considered, with respect to these one or more models, to be less significant.

The different respective determination rules applied in the at least two different states may lead to respectively different amounts of discarded information.

A first exemplary determination rule of the determination rules, which may be applied in at least one state of the state machine, requires that no information shall be discarded. The information then may be made available to the generating/updating process without any need for checking further conditions. The determining whether information shall be discarded or made available to the generating/updating process may then be considered to be represented by determining if the first exemplary determination rule shall be applied or not. The at least one state in which the first exemplary determination rule is applied may for instance be a state in which no model for the coverage area of the communication node has been generated so far (e.g. an initial state), or a state in which at least one model for the coverage area of the communication node is considered to be outdated (e.g. a ghost state).

A second exemplary determination rule of the determination rules, which may be applied in at least one state of the state machine, requires that the information shall be discarded if a position contained in the information is covered by a first-type model for the coverage area of the communication node produced by the generating/updating process, that the information shall be discarded if the position contained in the information is not covered by the first-type model but is covered by a second-type model for the coverage area of the communication node produced by the generating/updating process, and that the information shall be made available to the generating/updating process otherwise. In case that a model represents a hard boundary for the coverage area, the position may be understood to be covered by model if the position is within an area defined by the coverage model. Equally well, in case that a model represents a soft statistical boundary for the coverage area, other criteria may be applied to determine if the position may be understood to be covered by the model. For instance, if the model is based on the assumption that the positions are distributed in the coverage area according to a Gaussian distribution, a position may for instance be considered to be covered by the model if it is within the 2D 1σ area of the coverage area, or within any other area definable by a confidence value.

Therein, the first-type model and the second-type model are understood to differ from each other, for instance with respect to the area defined. The first-type model may for instance allow a pre-selection of information to be discarded, which may allow sorting out a vast amount of information, and the information that passes this pre-selection then is checked with respect to the second-type model that may allow a more refined analysis. The first-type model may for instance be a rectangular model. A rectangular model may allow only a coarse approximation of the coverage area of the communication node, but may also allow checking whether a position is covered by the rectangular model with low computational complexity (as for instance compared to polygonal, elliptical or circular models). The rectangular model thus may be particularly suited as a pre-filter for sorting out vast amounts of information with low computational complexity. The second-type model may for instance be an elliptical model. The elliptical model may allow modeling a coverage area of a communication node with increased accuracy compared to, for instance, a rectangular model. The first-type model may then for instance be a rectangular model obtained by fitting a rectangle representing the rectangular model into an ellipse representing the elliptical model. The elliptical model may for instance be a representation of a model for the coverage area of the communication node that is to be provided to one or more terminals for positioning purposes. This choice of the first-type and the second-type model for the coverage area may be based on the insight that a position covered by the rectangular model is in any case also covered by the elliptical model. Thus when actually targeting to check whether a position is covered by the ellipse (and discarding the positions covered by the ellipse, since they are considered insignificant in view of the current state of the state machine), it can first be checked if the position is covered by the rectangle (inscribed into the ellipse), since this check is computationally less complex and sorts out a large number of positions that then do not have to be checked with respect to the ellipse. Then it has to be checked only for the positions that are not covered by the rectangle whether they are covered by the ellipse or not.

Therein, a state of the state machine associated with the second exemplary determination rule may be a state in which the at least one model for the coverage area of the communication node produced by the generating/updating process is considered to be not based on enough information yet (e.g. a maturing state), or a state in which the coverage area is considered to have changed (e.g. a dubious state).

A third exemplary determination rule of the determination rules, which may be applied in at least one state of the state machine, requires that the information shall be made available to the generating/updating process if a position contained in the information is not covered by a model for the coverage area of the communication node produced by the generating/updating process, and that, if the position contained in the information is covered by the model, the information shall be discarded randomly according to a pre-defined probability criterion and otherwise made available to the generating/updating process.

While positions not covered by the model may all be significant, this may not hold for positions covered by the model. For instance, some positions covered by the model may be significant, and others may be not. To take this into account, and still to reduce the amount of information made available to the generating/updating process, it may be advantageous to maintain information with positions covered by the model at least randomly. The pre-defined probability criterion may for instance be a pre-defined probability value, e.g. 0.99. Randomly maintaining may then for instance be achieved by generating a random number between 0 and 1 and maintaining the information if the generated random number is larger than the pre-defined probability, for instance 0.99. The pre-defined probability criterion may also be based on further parameters the values of which are variable. For instance, the probability criterion may prescribe that the probability of discarding information shall be inversely proportional to a distance from the centre of a model for the coverage area of the communication node (so that with increasing distance, the probability of discarding information decreases), or proportional to the rate at which information is received (so that with increasing amount of information, the probability of discarding the information increases), to name but a few examples.

The model may for instance be a rectangular model. The model may for instance define a rectangle fitted around an ellipse defined by an elliptical model, wherein the elliptical model may be a representation of a model for the coverage area of the communication node that is to be provided to one or more terminals for positioning purposes. Information with positions outside the rectangle may then always maintained, whereas information with positions inside the rectangle is randomly rejected, which allows at least randomly maintaining information with positions in the area between the ellipse and the rectangle with a reasonable computational complexity. As positions outside the rectangle, also positions lying in this area between the ellipse and the rectangle indicate that the coverage area has changed (e.g. grown) and are thus significant for the generating/updating process.

A state of the state machine associated with the third exemplary determination rule may be a state in which the at least one model for the coverage area of the communication node produced by the process is considered to be complete (or at least substantially complete) (e.g. a stable state).

A fourth exemplary determination rule of the determination rules, which may be applied in at least one state of the state machine, requires that all information shall be discarded. This determination rule may for instance be associated with a state of the state machine in which it is assumed that at least one model for the coverage area of the communication node is complete and that the coverage area will not change in the future. The determining whether information shall be discarded or made available to the generating/updating process may then be considered to be represented by determining if the fourth-type determination rule shall be applied or not.

A fifth exemplary determination rule of the determination rules, which may be applied in at least one state of the state machine, requires that information is discarded randomly according to a pre-defined probability criterion (for instance a pre-defined probability value). For instance, in case of a high probability of discarding information, this determination rule may for instance be associated with a state in which it is assumed that the at least one model for the coverage area of the communication node is complete, but in which at least some information is not discarded to be able to monitor if changes in the coverage area occur.

A sixth exemplary determination rule of the determination rules, which may be applied in at least one state of the state machine, requires that the information shall be discarded if a position contained in the information is covered by a model for the coverage area of the communication node produced by the generating/updating process, and shall be maintained otherwise.

It is readily clear to a person skilled in art that although the above-described examples deal with a limited number of models, in reality any number of models may be applied in series, parallel or hierarchically to determine, if a position shall be discarded or maintained for further processing. Furthermore, also more than one determination rule may be applied in series, parallel or hierarchically.

The determining process may for instance be based on at least one model for the coverage area of the communication node produced by the generating/updating process. The at least one model may for instance be a model that is to be provided to terminals to enable them to perform positioning (i.e. position finding) or a representation or derivative thereof. The at least one model may equally well be derived from a model that is to be provided to terminals to enable them to perform positioning or from a representation or derivative of such a model.

The determining may then comprise checking if a position contained in the information is covered (for instance with respect to a hard boundary or a soft statistical boundary as explained above) by the at least one model on which the determining is based and discarding or making the information available to the generating/updating process at least partially based on an outcome of the checking. The position may for instance be a position of a terminal within the coverage area of the communication node, for instance the current position of the terminal at a time instant when the terminal is determined to be within the coverage area of the communication node, for instance when the terminal is able to hear the communication node. The position of the terminal may for instance be reported by the terminal together with an identification of the communication node and optionally further parameters. All information reported by the terminal may then be considered as the information that contains the position. The position of the terminal may for instance be reported in a so-called fingerprint, which comprise the position of the terminal and a list of the communication nodes in the coverage area of which the terminal is determined to be, i.e. a list of the communication nodes that can be heard by the terminal, and optionally further parameters as indicated above. Such a fingerprint thus provides a position of the terminal for several communication nodes at a time. Equally well, a fingerprint may contain a batch of positions of the terminal and associated communication node identifications, for instance gathered during a certain amount of time. It may also be the case that the position of the terminal is derived from one or more fingerprints that only contain a list of the communication nodes heard by the terminal.

The generating/updating process may be configured to produce, in addition to the at least one model on which the determining is based, at least one further model that differs from the at least one model on which the determining process is based at least in its format. For instance, both the model on which the determining is based and the at least one further model may be elliptical models, but may use respectively different formats (e.g. a matrix format for the model on which the determining is based and an axis/angle format (defined below, optionally with further parameters) for the at least one further model). Equally well, the model on which the determining is based may be an elliptical (or circular) model, and the at least one further model may be a rectangular model. Nevertheless, the model on which the determining is based may be derived or derivable from the at least one further model.

The checking if the position is covered by the at least one model on which the determining is based may then be less complex than a checking if the position is covered by the at least one further model. The checking may for instance be less complex since it requires less computation (for instance less operations). The model on which the determining is based may nevertheless require more memory for storage than the at least one further model.

It is to be noted that the above description of embodiments of the present invention is to be understood to be merely exemplary and non-limiting. Furthermore, the exemplary embodiments described above and in particular their single features shall be understood to be disclosed in all possible combinations with each other.

These and further aspects of the invention will be apparent from and elucidated with reference to the detailed description presented hereinafter.

DETAILED DESCRIPTION OF EXEMPLARY EMBODIMENTS OF THE INVENTION

Figure 1:
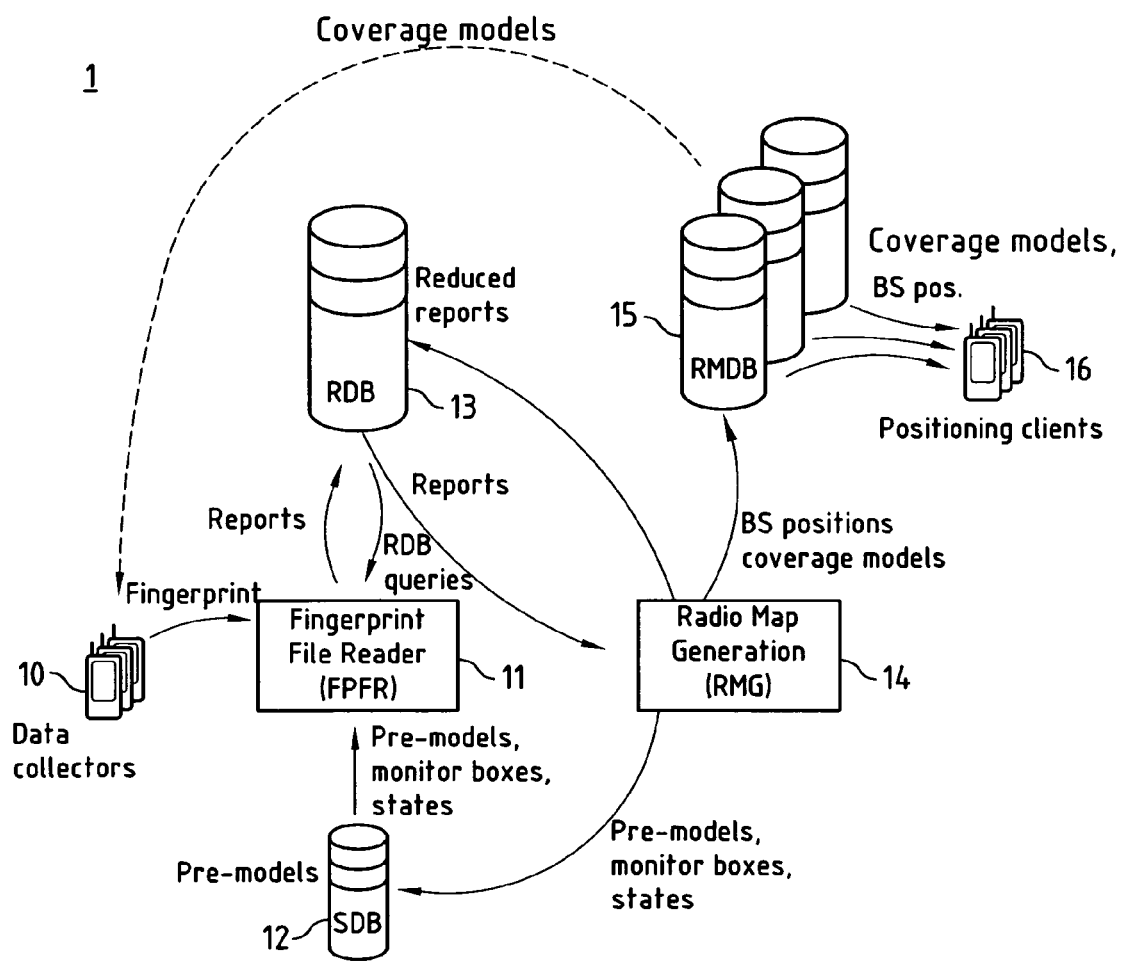
FIG. 1: A schematic block diagram of an exemplary embodiment of a system that implements aspects of the present invention.

Satellite positioning does not work well indoors or in other shadowed environments. However, various communication nodes are ubiquitous in the modern world. Non-limiting examples of such communication nodes include cellular base stations, WLAN access points, FM radio or TV stations. Instead of the term "communication node", also the term "base station" will be used in the following description, wherein the term "base station" is not necessarily understood to be restricted to a cellular base station. These base stations have good penetration and coverage virtually everywhere of interest. Since the range of these beacons may usually be relatively short (for instance hundreds of meters to some kilometers), these beacons may be exploited for positioning purposes.

For instance, WLAN-based positioning may complement Global Navigation Satellite System (GNSS) based positioning in urban environments. Typically GNSS-based positioning methods have problems in urban canyons—however, these are also areas, in which the WLAN AP density is high. WLAN-positioning also enables indoor positioning allowing for more effective Location Based Services (LBS).

WLAN Access Points (WLAN APs) can be used for positioning given that the position(s) of the AP(s) are known. In general, WLAN-based positioning assumes a database, either local (in the terminal) or remote (in the server) containing at least WLAN AP identification information (e.g. a WLAN AP Medium Access Control (MAC) address) and the geographical coordinates of the WLAN APs. The database may also contain an estimate of the WLAN AP position accuracy. Moreover, a coverage area may also be modeled.

The database of WLAN APs and their geographical coordinates and/or coverage models allow for positioning the terminal with WLAN. GNSS or some other conventional positioning capability may then not be required.

In positioning, the terminal performs a WLAN AP scan and then compares the scan results to the records in the database. If applicable records are found, the information is combined in some suitable manner (such as, weighted average based on Relative Signal Strength (RSS) values) to produce a position estimate for the terminal.

If the base station positions are known and distances from the terminal to the base stations can be estimated, the terminal's position can be estimated through triangulation.

If models for the base station coverage areas are known, then a terminal may pick the coverage areas for the heard base stations and find the intersection of these coverage areas. The terminal can then be assigned a position that is, for instance, the center-of-mass of the intersection area. Moreover, a position error estimate may be given based on the size of the intersection.

These mechanisms may also be combined: distance measurements can be combined with coverage area models to produce a position estimate. Even satellite (GNSS) pseudorange measurements may be taken into account in these hybrid methods to obtain additional measurements.

The database for WLAN-based positioning can be built in various ways. One solution may be that a company buys hotspot directories from WLAN network providers and assimilates these directories in their databases. Alternatively, a plurality of terminals may perform the WLAN AP mapping. In such a case the terminals may have a Global Navigation Satellite System (GNSS) or Assisted GNSS (AGNSS) receiver attached to or inside the terminal and provide data on the WLAN AP's coverage. It may also be the case that the database build-up is a community-based effort.

It is readily understood by a person skilled in the art that the techniques described above in the context of a WLAN system are equally applicable with any other radio network-technology as well. Potential candidates include Bluetooth, Wibree (Ultra Low Power Bluetooth), Global System for Mobile Communication (GSM), Wideband Code Division Multiple Access (WCDMA), Code Division Multiple Access (CDMA), Long Term Evolution (LTE), Worldwide Interoperability for Microwave Access (WiMAX), to name but a few non-limiting examples.

The above-described WLAN-based positioning may also be combined/complemented with Cell ID-based positioning. When collecting the data for the WLAN AP database, also information on 2G (second generation, e.g. GSM) and/or 3G (third generation, e.g. UMTS) cells (or cells of any other cellular communication system) that can be observed in the present position (serving station and optionally also the neighboring stations) may be collected.

The data collected on WLAN APs and 2G/3G cells can for instance be collected on central servers and distributed to the terminals for position determination.

FIG. 1 schematically illustrates the functional blocks of an exemplary system 1 that implements aspects of the present invention.

The server side of the system 1 comprises two processing blocks, Finger Print (FP) File Reader (FPFR) block 11 and Radio Map Generation (RMG) block 14. Moreover, there are three data stores, Report Data Base (RDB) 13, Screening Data Base (SDB) 12 and Radio Map Data Base (RMDB) 15. Each can be either centralized or, for example, regionally distributed. Moreover, although the exemplary architecture shows several different databases, they can be implemented as one single same database or may be broken down in more databases in different implementations. It is clear to a person skilled in the art that the actual number and naming of databases is an implementation issue and does not affect the concepts disclosed in this specification. The terminals 10 acting as data collectors or positioning clients 16 can also be seen as processing blocks of system 1.

The one or more terminals (e.g. mobile terminals) 10 with positioning capacity (e.g. GNSS) send a fingerprint comprising one or more positions (i.e. terminal positions, for instance the terminal's coordinates, optionally with an error estimate) and a list of one or more base station IDs heard at each position, and optionally further parameters such as for instance their signal strengths and/or approximate ranges.

The fingerprint arrives to the FPFR block 11, which splits the information into base-station-specific reports, and stores the base-station-specific reports, which, in the simplest case, are only terminal positions, into the RDB 13.

Therein, it is to be noted that the base station does not necessarily have to be the primary record for storing fingerprints/reports. Equally well, the fingerprints may be stored in a database in a position-specific way, so that the according entries in the database then may pertain to several base stations. The fingerprints may of course also be stored and/or processed according to other criteria.

FPFR block 11 implements a filter that drops (discards) reports, for instance when they are considered to add no new information to the already collected data. In particular, to be able to deal with the massive number of incoming reports, the FPFR block 11 may for instance make use of simplified pre-models of the coverage area (stored in SDB 12) to be able to quickly drop a large number of redundant reports.

The RMG block 14 reads (for instance continuously or periodically, or in response to a trigger event, such as an arrival of a new report or an accumulation of a certain amount of reports) reports from the RDB 13, and updates the coverage models (for instance elliptical models) to be distributed and delivered to the positioning clients 16, and the simplified pre-models to be fed back to the FPFR block 11 performing report screening (via SDB 12). The RMG block 14 may also remove redundant reports from RDB 13, keeping only a small but representative set of reports on the coverage area of each base station.

Finally, the coverage models are delivered to terminals 16 to be used for positioning on their own or combined to other positioning data in the terminal.

The following two ellipse formats are exemplarily used in this specification:

An "axis/angle-form" ellipse, defined by coordinates of the centre (in World Geodetic System WGS-84) longitude and latitude, lengths of the semi-major and semi-minor axes (in meters, referring to WGS-84 coordinates), and orientation of the semi-major axis (degrees, clock-wise from North). Moreover, a confidence value can be included as well. If the ellipse is interpreted in a statistical sense, i.e. to represent a soft statistical boundary for the positions in the coverage area rather than a hard boundary that includes all positions in the coverage area, the confidence value may specify which area with respect to the coverage area the ellipse describes. For instance, if the positions are assumed to be statistically distributed in the coverage area according to a 2D Gaussian distribution, the confidence value may for instance express if the ellipse represents the $\sigma$, $2\sigma$ or $3\sigma$ area of the 2D Gaussian distribution, wherein $\sigma$ is the standard deviation. Therein, the $\sigma$, $2\sigma$ and $3\sigma$ areas may for instance be understood as the areas in which 39%, 86% and 99% of the terminal positions are considered to be within, respectively.

A "matrix-form" ellipse: coordinates (WGS-84) of the centre c=($lat_E$,$lon_E$), and three coefficients a>0, d>0, and b so that point x=(lat, ion) is inside the ellipse if $$(x-c)^T A(x-c) \leq 1$$

with $$A = \begin{bmatrix} a & b \\ c & d \end{bmatrix}.$$

The matrix-form ellipse may require more memory space for storage, but may be faster to manipulate than the axis/angle-form ellipse. Similar to the axis/angle-form ellipse, also the matrix-form ellipse may represent a soft statistical boundary for the positions in the coverage area rather than a hard boundary that includes all positions in the coverage area. For instance, the centre c may then be interpreted as the mean value and the matrix A may then be interpreted as the covariance matrix, for instance of a 2D Gaussian distribution assumed for the distribution of the positions in the coverage area. The ellipse may then no longer coincide with the outer boundary of the coverage area, it may rather define a sub-area of the coverage area, for instance the σ area.

Details on conversion between the two axis/angle-form ellipse and the matrix-form ellipse are given in Appendix A.1.

In the following, exemplary embodiments of the present invention will be described in further detail with frequent reference to the exemplary system of FIG. 1. It is however to be understood that the present invention and its exemplary embodiments are not necessarily bound to the exemplary system architecture presented in FIG. 1.

Figure 2:
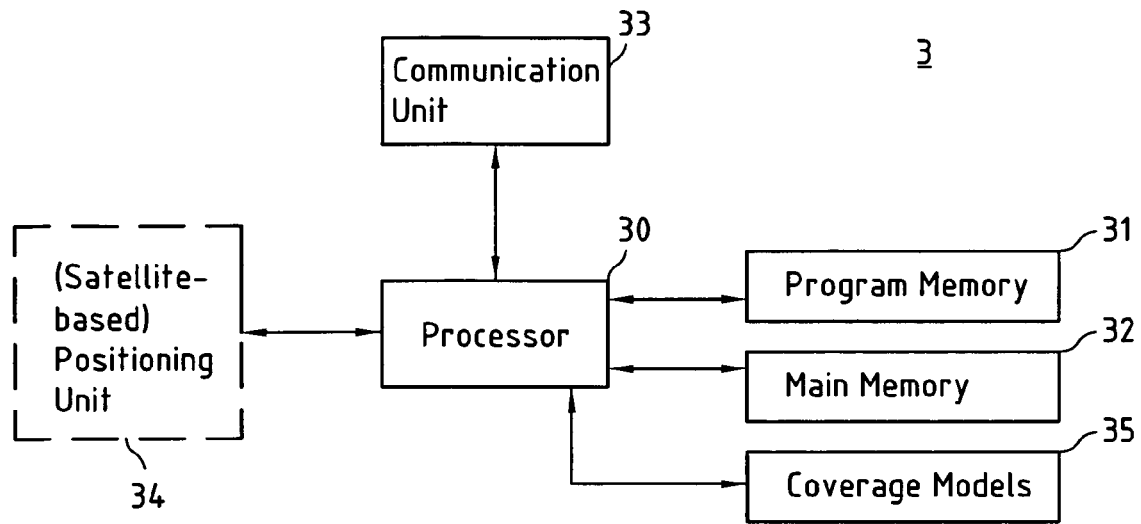
FIG. 2: a schematic block diagram of an exemplary embodiment of an apparatus related to position determining according to the present invention.

FIG. 2 shows an exemplary embodiment of an apparatus 3 according to the present invention, which apparatus may for instance be a terminal 16 (see FIG. 1) or a part thereof.

Apparatus 3 comprises a processor 30 that interfaces with a program memory 31, a main memory 32, a memory 35 for coverage models, a communication unit 33 and an optional (for instance satellite-based) positioning unit 34.

Processor 30 is at least configured to operate a position determining process capable of determining a position of a terminal based on at least one model generated and/or updated by a generating/updating process in dependence on at least one state of a state machine. To this end, processor 30 may for instance run a computer program with program code for operating a position determining process capable of determining a position of a terminal based on at least one model generated and/or updated by a generating/updating process in dependence on at least one state of a state machine, which program code may for instance be stored in program memory 31, which may be fixedly attached in apparatus 3 or may be a removable memory. Main memory 32 is used by processor 30 as a working memory, for instance to store intermediate results and variables. Memory 35 may store the at least one model generated and/or updated by the generating/updating process.

Communication unit 33 is configured to allow processor 30 to communicate with other devices, for instance to receive one or more coverage models for one or more base stations, and to receive states of a state machine, explained in further detail below, respectively associated with the coverage models, for instance from RMDB 15 (see FIG. 1). Communication unit 33 is further configured to enable apparatus 3 to exchange data with base stations of communication systems.

Optional positioning unit 34 is configured to allow apparatus 3 to determine its position, for instance based on GNSS and/or other positioning techniques (including fingerprint-based positioning techniques).

The position determining process operated by processor 30 now comprises determining (with the help of communication unit 33) which base stations (of the same or multiple communications systems) can currently be heard, and determining, based on coverage models for these base stations, the current position of the terminal. Exemplary methods how this can be accomplished have already been described above.

As will be explained in more detail with reference to FIG. 16 below, a state machine may for instance be associated with one or more models produced by the RMG process that generates and/or updates models that are used as pre-models in FPFR block 11 (see FIG. 1) and as coverage models, i.e. models that are to be distributed to the positioning clients 16, in RMDB 15. The states of the state machine may for instance correspond to states of at least one of the one or more models generated by the RMG process, wherein these states may in turn be related to the RMG process, for instance with respect to the progress of generating/updating of this at least one model. In the following, due to their correspondence, no differentiation will be made between the states of the state machine and the states of the at least one of the one or more models. The at least one model may for instance be referred to as a state-machine-associated model. In the exemplary system of FIG. 1, this state-machine-associated model may for instance be considered as the coverage model (e.g. the elliptical model in 3GPP format) that is to be provided to positioning clients to allow them to perform positioning.

These states (and the state machine) may also be considered to be associated with the coverage area for which the one or more models are generated/updated (and also with the base station of this coverage area).

Examples of such states, which will be explained in more detail below, are (see FIG. 16): an INITIAL state, a MATURING state, a STABLE state, a DUBIOUS state and a GHOST state.

Figure 3:
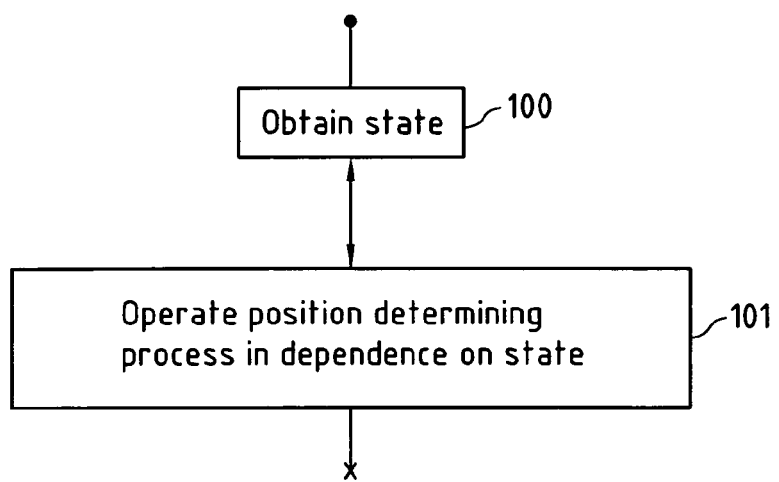
FIG. 3: a flowchart of an exemplary embodiment of a method related to position determining according to the present invention.

FIG. 3 is a flowchart of an exemplary embodiment of a method according to the present invention. This flowchart may for instance be implemented as a computer program that is stored in program memory 31 of apparatus 3 (see FIG. 2) and executed by processor 30 of apparatus 3.

In a first step 100, a state of a state machine is obtained. This may for instance be accomplished via communication unit 33 of apparatus 3 (see FIG. 2), for instance, a state may be received from RMDB 15 (see FIG. 1).

In a second step 101, a position determining process is then operated in dependence on the obtained state. An example of operating the position determining process in dependence on the obtained state is that the position determining process does not use a coverage model when it has a specific state, for instance a DUBIOUS state. The DUBIOUS state indicates that the coverage model generated by the RMG process may not be reliable, and may thus lead to errors in the position determining process. Similarly, a coverage model associated with an INITIAL, MATURING and/or GHOST state may not be used in the position determining process, i.e. then only a coverage model with a STABLE state may be used. Depending on, for instance, how long it takes for a coverage model to be considered stable and/or on the frequency of providing coverage models from RMDB 15 to the positioning clients 16, also coverage models in MATURING state may already be used in the position determining process. Likewise coverage areas INITIAL state can be used in position determination. The actual choice of functioning is implementation-dependent.

Returning to the exemplary system of FIG. 1, the one or more terminals 10 send fingerprints. Fingerprints may for instance include available network measurements for 2G (e.g. GSM) and/or 3G (e.g. UMTS) serving and neighboring base stations as well as for WLAN base stations (access points). The network measurements for instance comprise the base station identification of the base stations heard, but may also include signal strength (Received Signal Strength, RSS) and timing measurements (such as Timing Advance, TA and/or Round Trip Delay), which may be indicative of the range to the base station. The majority of the fingerprints contain one or more estimates of the terminal's position, optionally with associated error estimates. The fingerprints may further contain one or more timestamps.

Figure 4:
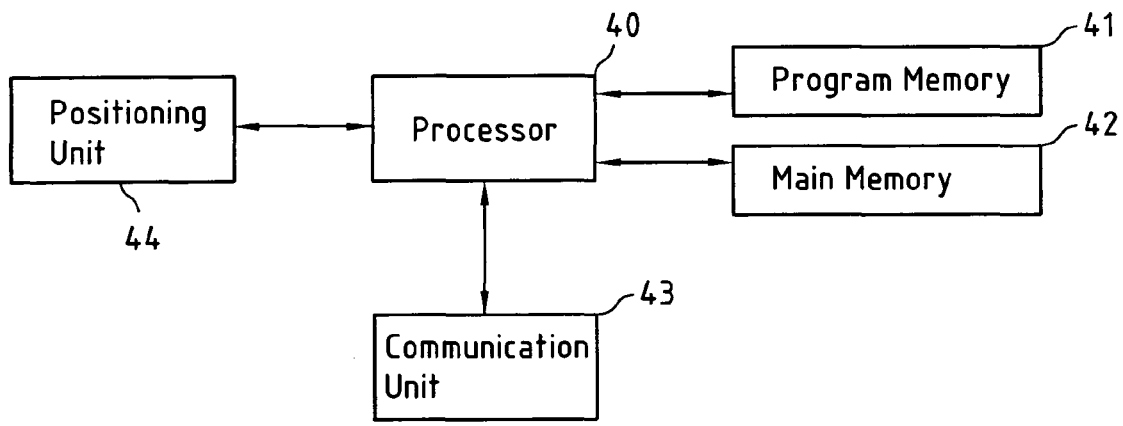
FIG. 4: a schematic block diagram of an exemplary embodiment of an apparatus related to information providing according to the present invention.

FIG. 4 shows an exemplary embodiment of an apparatus 4 according to the present invention, which apparatus may for instance be a terminal 10 (see FIG. 1) or a part thereof.

Apparatus 4 comprises a processor 40 that interfaces with a program memory 41, a main memory 42, a communication unit 4 and a positioning unit 44. Processor 40 is at least configured to operate an information providing process associated with a generating/updating process in dependence on at least one state of a state machine. To this end, processor 40 may for instance run a computer program with program code for operating an information providing process associated with a generating/updating process in dependence on at least one state of a state machine, which program code may for instance be stored in program memory 41, which may be fixedly attached in apparatus 4 or may be a removable memory. Main memory 42 is used by processor 40 as a working memory, for instance to store intermediate results and variables.

Communication unit 43 is configured to allow processor 40 to communicate with other devices, for instance to receive one or more states of a state machine (explained in detail below), for instance from RMDB 15 (see FIG. 1) and to output information (fingerprints), for instance to FPFR block 11 (see FIG. 1). Communication unit 43 is further configured to enable apparatus 4 to exchange data with base stations of communication systems.

Positioning unit 44 is configured to allow apparatus 4 to perform positioning (i.e. position finding), for instance based on GNSS and/or other positioning techniques (including for instance fingerprint-based positioning techniques, but this may not be preferred or only applied with due care since it may induce circular reasoning into the exemplary system of FIG. 1).

The information providing process operated by processor 40 now comprises gathering a position of apparatus 4 as determined by positioning unit 44, determining which base stations can currently be heard (for instance received with sufficient signal-to-noise ratio), and outputting this information as a fingerprint, optionally with further information as explained above (timestamp, RSS, TA, etc.), for instance by sending it to FPFR unit 11 (see FIG. 1) via communication unit 43. This information providing process is operated in dependence on at least one state of a state machine, as will be described with reference to FIG. 5 below.

Figure 5:
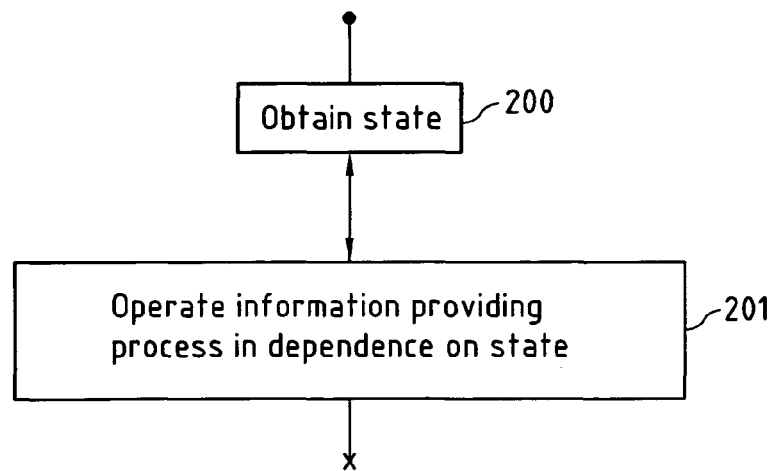
FIG. 5: a flowchart of an exemplary embodiment of a method related to information providing according to the present invention.

FIG. 5 is a flowchart of an exemplary embodiment of a method according to the present invention. This flowchart may for instance be implemented as a computer program that is stored in program memory 41 of apparatus 4 (see FIG. 2) and executed by processor 40 of apparatus 4.

In a first step 200, a state of a state machine is obtained. This may for instance be accomplished via communication unit 43 of apparatus 4 (see FIG. 2), for instance a state may be received from RMDB 15 (see FIG. 1). Once again, as examples of such states (see FIG. 16), the INITIAL, MATURING, STABLE, DUBIOUS and GHOST state are assumed.

In a second step 201, an information providing process is then operated in dependence on the obtained state. This may for instance be performed by adapting an amount (for instance how much information in addition to the positions and base station identifiers is sent in a fingerprint) and/or frequency (for instance how often fingerprints are sent) and/or type of information (for instance only significant fingerprints are sent) that is provided in dependence on the state. For instance, in an INITIAL state and/or a GHOST state, a frequency of providing information may be higher than in a STABLE state. Furthermore, in certain states (such as a STABLE state or a MATURING state), it may be determined in step 201 if information is significant or not, and only significant information may then be provided. For instance, in a STABLE state (or also in a MATURING state), if one or more models of the coverage area of a base station heard are available, it may be checked if a current position is already covered by these one or more models, and the position (and the according base station identifier) may then only be reported if the position is not already covered, indicating that it is a significant position.

Returning to the exemplary system of FIG. 1, FPFR block 11 generates base-station specific reports from the fingerprints sent by data collectors 10, for instance in the form of Table 1, for storage in RDB 13.

TABLE 1

Exemplary Report Format

| Parameter | Description |
| --- | --- |
| ID | Unique ID code of the base station |
| Type | 2G/3G active/neighbour, WLAN, WiMAX, etc. |
| Timestamp | Timestamp |
| Position | Reported position |
| RSS | Received signal strength (if available) |
| Range | Range to base station (if available) |

In the exemplary system of FIG. 1, fingerprints containing measurements with respect to several base stations are split by base station and treated separately.

RDB 13 may for instance only store a maximum pre-defined number of reports with respect to each base station, and it may be targeted to use as little computation as possible to sieve the significant ones from the mass of incoming reports.

RMG block 14 exemplarily uses a polygon to represent the terminal positions that are reported by the one or more terminals 10 (see FIG. 1), pass the FPFR block 11 and are at least temporarily stored (in the form of reports) in RDB 13. This polygon is exemplarily assumed to be a convex polygon that represents (or parameterizes) a convex hull (the present invention is however not limited thereto). That is, instead of storing all terminal positions received from FPFR block 11 in RDB 13, only the terminal positions that form the vertices of a convex polygon that encloses all these terminal positions are stored. Therein, the maximum number of vertices of this convex polygon may be limited to some pre-defined value. If the number of vertices of the convex polygon exceeds this maximum number, vertices of the convex polygon may be merged to form a convex polygon (with increased area as compared to the original convex polygon) in a way that still all terminal positions are within the polygon.

This is accomplished by RMG block 14 by overwriting the reports in the RDB 13 with a reduced set of reports, i.e. those reports that are associated with the terminal positions that form the polygon (i.e. its vertices), or by accordingly deleting reports from RDB 13.

Nevertheless, depending on the monitoring status of the border terminal positions/reports (i.e. the vertices of the polygon), also interior terminal positions/reports (i.e. terminal positions/reports within the polygon) may be stored in RDB 13.

Figure 6:
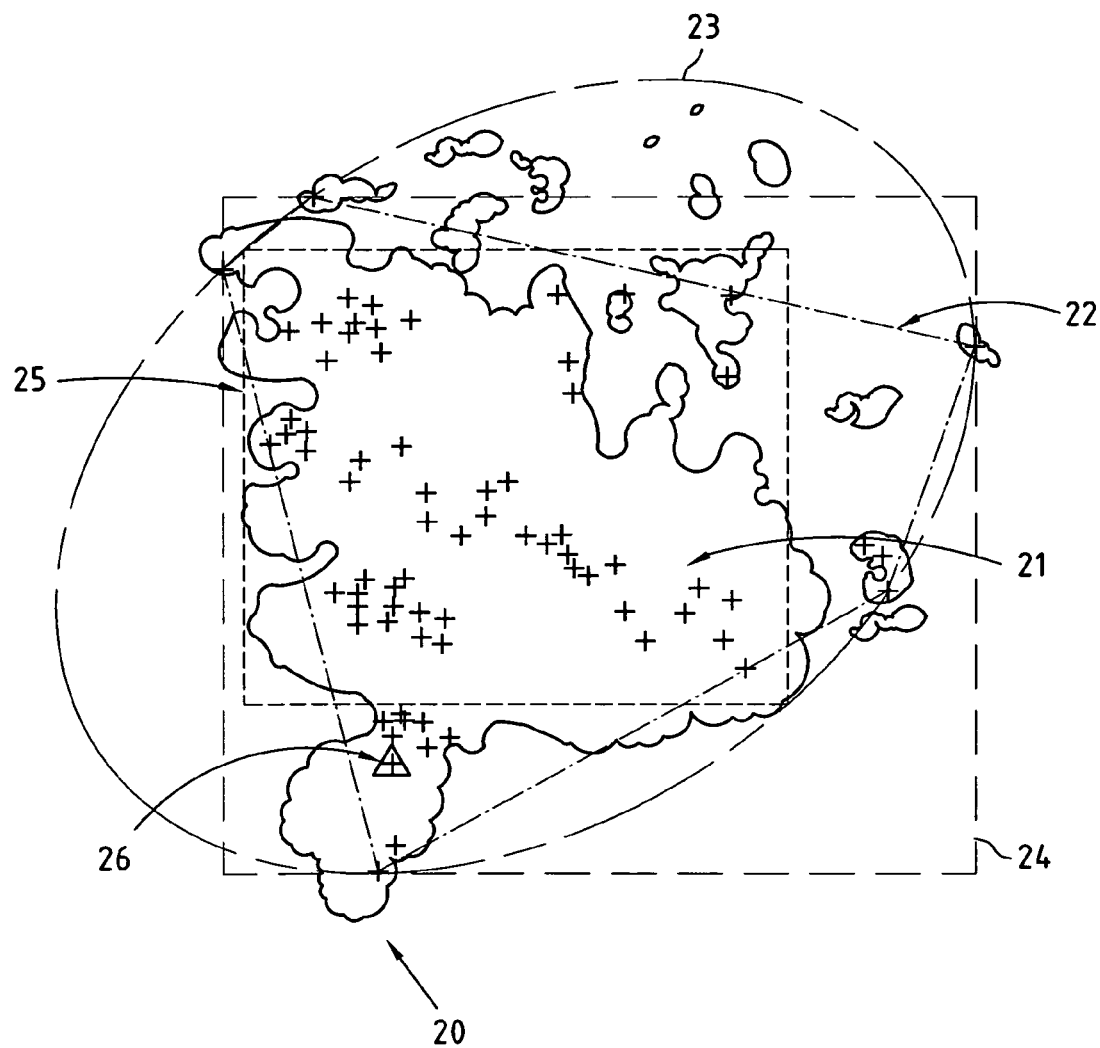
FIG. 6: a schematic illustration of an exemplary coverage area of a base station with exemplary models for this coverage area.

An example of a convex polygon 22 fitted around the terminal positions 21 in a coverage area 20 of a base station 26 is given in FIG. 6.

In addition to the polygon 22 serving as a model for the coverage area of the base station, the RMG block 14 (see FIG. 1) further generates a coverage model and different pre-models based on this polygon 22, as will be described now.

All of these models (including the polygon) are models for the coverage area of the base station. In the following, models for the coverage area of the base station that are to be provided to the positioning terminals 16 (see FIG. 1) will be denoted as "coverage models" (e.g. the axis/angle-form ellipse (either representing a hard boundary or a soft statistical boundary) or a model that is based on the parameters of the axis/angle-form ellipse and for instance adds one or more further parameters, also either representing a hard boundary or a soft statistical boundary), whereas the models for the coverage area of the base station that are provided to FPFR 11 and stored in SDB 12 will be denoted as "pre-models" (e.g. the inner box, outer box and matrix-form ellipse models (which may also represent a hard boundary or a soft statistical boundary)).

In the following, for simplicity of presentation, it will exemplarily be assumed that the coverage models and pre-models represent hard boundaries for the positions in the coverage area.

In the exemplary system of FIG. 1, an elliptical coverage model is generated by RMG block 14 by fitting the minimum enclosing ellipse around the polygon 22 (see for instance ellipse 23 enclosing convex hull 22 in FIG. 6). When updating this ellipse, the old ellipse may be used as the initial guess. The ellipse (or a model derived from this ellipse, for instance a model having the parameters of the axis/angle-form ellipse and further parameters) may then be saved in RMDB 15 (as coverage model).

Figure 7:
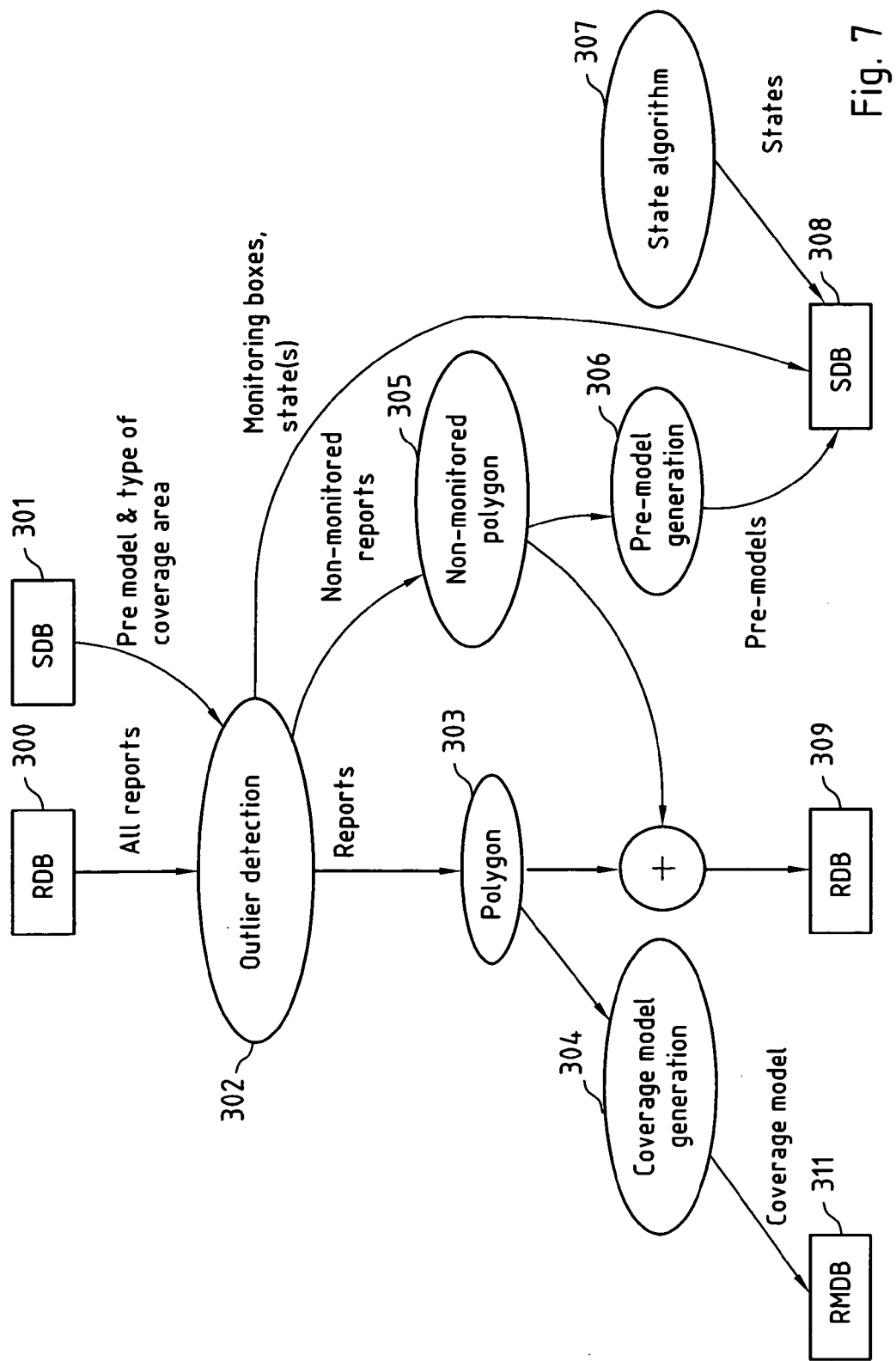
FIG. 7: a schematic information-flow diagram with respect to the generation/updating of a polygonal representation of the coverage area of a base station, the coverage model and the pre-models derived from this polygon.

FIG. 7 is a schematic information-flow diagram with respect to the generation/updating of a polygonal representation (i.e. a model) of the coverage area of a base station and the coverage model and the pre-models derived from this polygon.

Block 302 performs outlier detection, which is based on pre-models and/or information on the type of coverage area to be determined, for instance the maximum possible radius of the coverage area, as stored in SDB 301 (corresponding to SDB 12 of FIG. 1). The concepts of outlier detection and monitoring will be explained in further detail below.

For all reports contained in RDB 300 (corresponding to RDB 13 of FIG. 1), a polygonal representation is determined in block 303. This polygon is then input into block 304, where a coverage model (e.g. an ellipse in axis/angle form, optionally with further parameters) is generated from the polygon, and this coverage model is then stored in RMDB 311 (corresponding to RMDB 15 of FIG. 1).

For all currently non-monitored reports (i.e. those reports that are neither suspected to be outliers nor suspected to be outdated), a non-monitored polygon is determined in block 305, and this non-monitored polygon serves as a basis for pre-model generation in block 306. The pre-models output by this block (e.g. an ellipse in quick 2D format, the inner box and outer box, see FIG. 4) are then stored in SDB 308 (corresponding to SDB 12 in FIG. 1). SDB 308 further stores monitoring boxes (explained in more detail below), which may be required in FPFR 11 block, and state information (e.g. a current state of the state machine) (explained in more detail below), from block 302. SDB 308 further receives collection state information from collection state algorithm block 307.

Information on the polygon determined in block 303 and on the non-monitored polygon determined in block 305 is stored back to RDB 309 (corresponding to RDB 13 in FIG. 1).

Each of blocks 303, 304, 305 and 306 in FIG. 7, or some or all of these blocks taken together, may be considered to represent a generating/updating process that generates and/or updates at least one model for the coverage area of a base station. The functionality of all blocks 303, 304, 305 and 306 taken together is referred to as RMG process in this specification.

Figure 8:
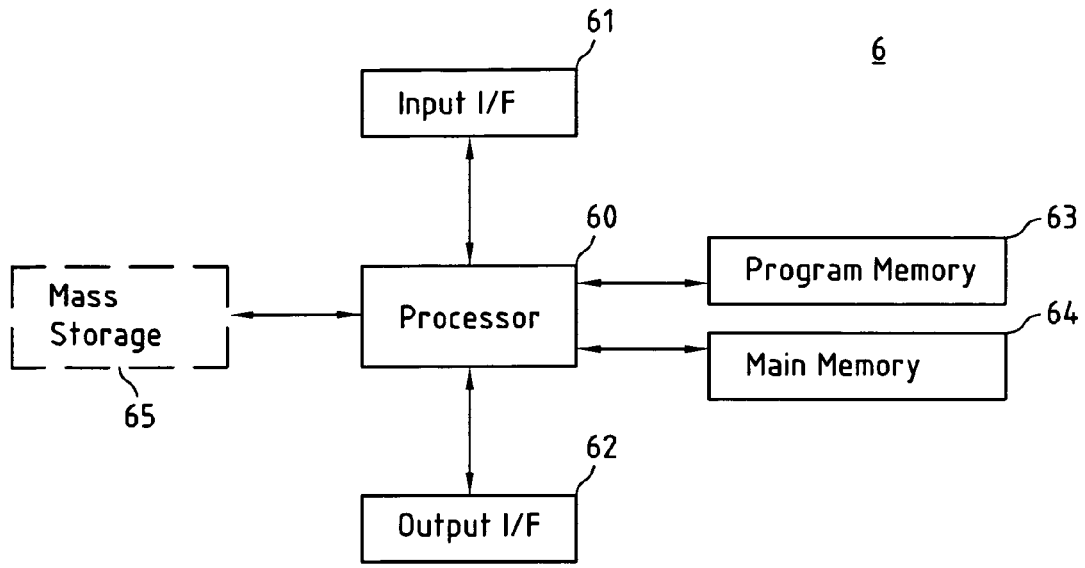
FIG. 8: a schematic block diagram of an exemplary embodiment of an apparatus related to generating and/or updating models for a coverage area of a base station according to the present invention.

FIG. 8 is a further exemplary embodiment of an apparatus 6 according to the present invention. Apparatus 6 comprises a processor 60 that communicates with an input interface 61, and output interface 62, a program memory 63 and a main memory 64. Optionally, apparatus 6 may comprise a mass storage 65.

Processor 60 is configured to operate a generating/updating process that comprises generating and/or updating at least one model for a coverage area of a base station in dependence on at least one state of a state machine. To this end, processor 60 may for instance execute a computer program with program code for operating a generating/updating process that comprises generating and/or updating at least one model for a coverage area of a base station in dependence on at least one state of a state machine. This computer program may for instance be stored in program memory 63, which may be fixedly attached in apparatus 6 or may be a removable memory. Main memory 64 is used by processor 60 as a working memory, for instance to store intermediate results and variables.

Input interface 61 is configured to receive information that is used by processor 60 to operate the generating/updating process in dependence on at least one state of the state machine, for instance base-station-specific reports with positions of terminal, and a current state of the state machine.

Output interface 62 is configured to output information produced by processor 60, for instance one or more models for the coverage area of the base station.

If mass storage 65 is present in apparatus 6, processor 60 may be further configured to store information in mass storage 65 and to retrieve information from mass storage 65.

Figure 9:
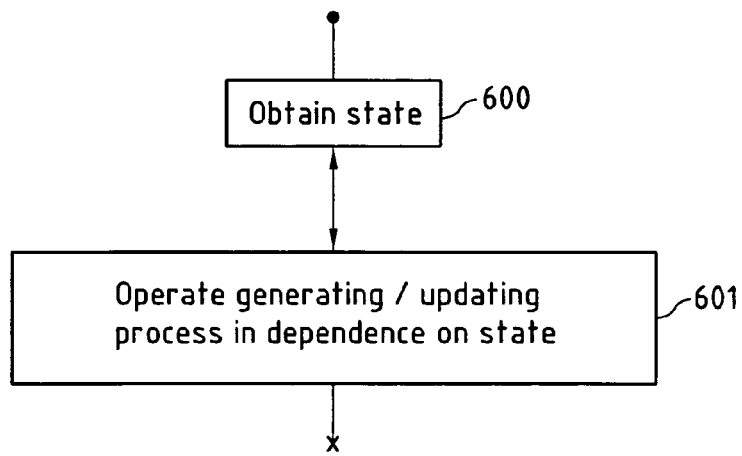
FIG. 9: a flowchart of an exemplary embodiment of a method related to generating and/or updating models for a coverage area of a base station according to the present invention.

FIG. 9 is a flowchart of a further exemplary embodiment of a method according to the present invention. This flowchart may for instance be implemented as a computer program that is stored in program memory 63 of apparatus 6 (see FIG. 8) and executed by processor 60 of apparatus 6.

In a first step 600, a state of a state machine is obtained. This may for instance be accomplished via input interface 61 of apparatus 6 (see FIG. 8).

In a second step 601, a generating/updating process is then operated in dependence on the obtained state.

Returning to FIG. 8, processor 60 may for instance be configured to at least partially implement the RMG process (see block 14 of FIG. 1), i.e. to at least partially implement the blocks 303, 304, 305 and 306 (see FIG. 7) and may thus be able to at least partially generate/update the polygonal model of the coverage area, the coverage model that is to be sent to the positioning clients 16 (see FIG. 1) and the pre-models that are used in FPFR block 11.

As an example, processor 60 may implement the generating/updating of the polygon and of the coverage model (e.g. an elliptical coverage model), i.e. to implement the functionality of the blocks 303 and 304 of FIG. 7.

As a further example, processor 60 may implement the generating/updating of the polygon (block 303), of the coverage model (block 304), of the non-monitored polygon (block 305) and of the pre-models (block 306), i.e. the entire RMG process.

This latter example will be further described in the following. Therein, it will further exemplarily be assumed that processor 60 is further configured to operate the state machine. Therein, it is to be understood that the state machine may equally well be operated by one or more other unit.

If processor 60 is assumed to implement the RMG process and the state machine, input interface 61 may for instance be configured to receive reports from RDB 13. Therein, processor 60 may be able to differentiate whether the reports are monitored or not. This may for instance be possible because the reports are associated with according identifiers (not shown in Table 1), or because processor 60 further is configured to at least partially implement the monitoring process, to name but a few examples.

Output interface 62 may then be configured to output some or all of the generated/updated models, for instance the pre-models to SDB 12 (see FIG. 1) and the coverage model to RMDB 15, and also to output the states to SDB 12 and RMDB 15.

If mass storage 65 is present in the apparatus 6 of FIG. 8, mass storage 65 may for instance implement one or all of the RDB 13 (see FIG. 1), SDB 12 and RMDB 15 databases (either as separate data bases or as a single common data base).

Furthermore, processor 60 of apparatus 6 may further be configured to implement the functionality of FPFR block 11 (see FIG. 1).

The type of information received by input interface 61 and output by output interface 62 and exchanged via the connection between processor 60 and mass storage 65 depending on the amount of functionality implemented by processor 60 as described above is readily clear for a person skilled in the art from the disclosure of FIG. 1.

As indicated above, it is exemplarily assumed that processor 60 of apparatus 6 (see FIG. 8) implements the RMG process and the state machine. Exemplary embodiments of the RMG process will now be described to indicate how the RMG process depends on the state machine. Therein, the state machine is assumed to have the exemplary INITIAL, MATURING, STABLE, DUBIOUS and GHOST state already introduced above (and explained in more detail with respect to FIG. 16 below).

Figure 10:
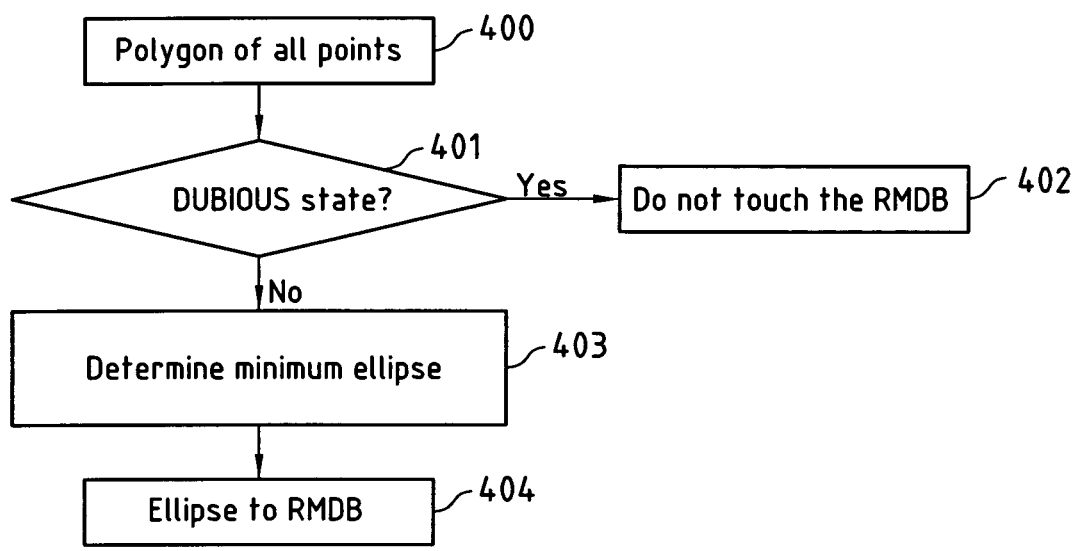
FIG. 10: a flowchart of an exemplary embodiment of a method for generating an elliptical coverage model according to the present invention.

FIG. 10 is a flowchart of an exemplary method for generating a coverage model, exemplarily an elliptical coverage model, within the RMG process. This flowchart constitutes an example of the functions performed in blocks 303 and 304 of FIG. 7 and may for instance be performed by processor 60 of apparatus 6 (see FIG. 8) when executing step 601 of the flowchart of FIG. 9.

In a first step 400, a polygon is determined, for instance based on all reports. If the current state, which is for instance obtained by processor 60 (see FIG. 8) in step 600 of the flowchart of FIG. 9, is DUBIOUS, no action is performed, and in particular, updated coverage model is not stored to RMDB 15 of FIG. 1, since this would mean providing the positioning clients 16 of FIG. 1 with a coverage model that is considered to be potentially wrong.

It the current state is not DUBIOUS, a minimum ellipse is determined around the polygon of all points. The ellipse is then stored to RMDB 15 in step 404 (for instance in axis/angle format, optionally with further parameters). Therein, the ellipse may not be written to RMDB 15 if it does not differ from an existing ellipse stored therein.

Table 2 illustrates an exemplary coverage model entry (for a 3GPP ellipse) in RMDB 15.

TABLE 2

Exemplary coverage model entry in the

| Parameter | Description |
| --- | --- |
| ID | Unique ID code of the base station |
| Type | 2G, 3G, WLAN, etc. |
| state | State from SDB |
| Position | Base station position (if available) |
| Coverage model | Coverage model, e.g. a model comprising the parameters of the axis/angle-form ellipse and optionally further parameters |

The RMG process may furthermore generate the following exemplary pre-models (see blocks 305 and 306 of FIG. 7; this may for instance be performed by processor 60 of apparatus 6 of FIG. 8 when executing step 601 of the flowchart of FIG. 9), see FIG. 6:

matrix-form ellipse 23: Minimal ellipse fitted around the polygon 22, in matrix-form. All reports so far are inside the matrix-form ellipse 23.

outer box 24: Formed from minimum and maximum coordinates of the matrix-form ellipse 23. All reports so far are inside the outer box 24.

inner box 25: Maximal box fitted inside the outer ellipse 23. Reports inside the inner box 25 do not change the current ellipse.

Table 3 illustrates an exemplary entry in SDB 12.

TABLE 3

Exemplary SDB entry

| Parameter | Description |
| --- | --- |
| ID | Unique ID code of the base station |
| timestamp | time when pre-models were last modified |
| Type | 2G, 3G, WLAN, etc. |
| State | State of the state machine |
| monitorBox | Monitoring boxes |
| monitorExp | Monitoring expiry timestamps |
| InnerBox | Pre-model (min/max/lat/lon) |
| OuterBox | Pre-model (min/max/lat/lon) |
| Ellipse | Pre-model (matrix-form) |

A further exemplary embodiment of operating a process in dependence on at least one state of a state machine according to the present invention can be implemented in FPFR block 11 of the exemplary system of FIG. 1 and will be described in the following.

According to this exemplary embodiment, in FPFR block 11, a screening of incoming fingerprints/reports is performed to determine if these incoming fingerprints/reports shall be discarded or made available to the RMG process. This screening is based on the states of the state machine. Once again, the state machine is exemplarily assumed to have the INITIAL, MATURING, STABLE, DUBIOUS and GHOST states.

Figure 11:
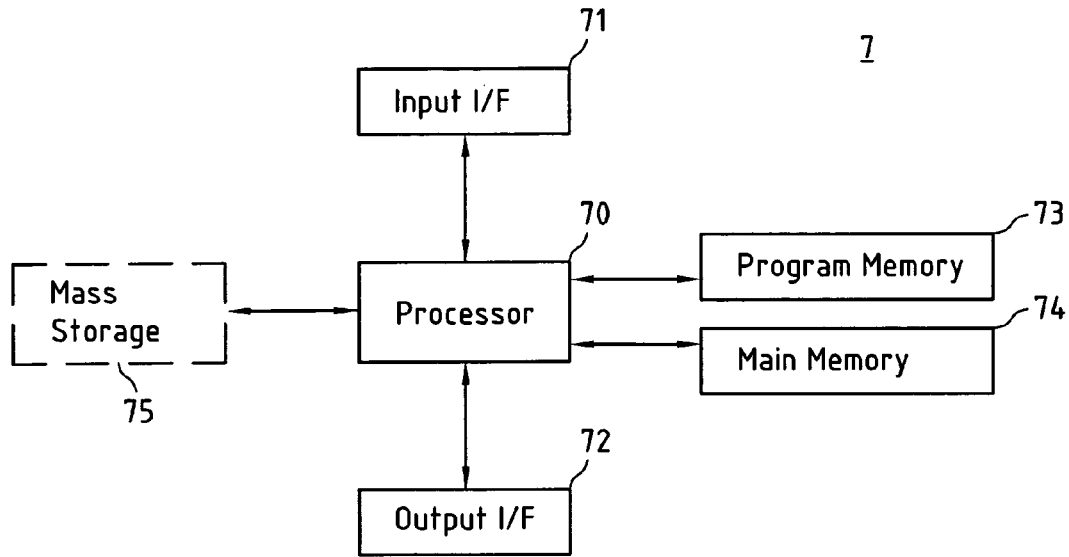
FIG. 11: a schematic block diagram of an exemplary embodiment of an apparatus related to determining whether information shall be discarded or not according to the present invention.

Accordingly, FIG. 11 is a schematic illustration of an exemplary embodiment of an apparatus 7 according to the present invention. The apparatus 7 comprises a processor 70, which communicates with input interface 71, output interface 72, program memory 73 and main memory 75. Optionally, there may exist a mass storage 75 in apparatus 7.

Processor 70 is configured to operate a determining process that comprises determining whether information useable in a generating/updating process shall be discarded or made available to the generating/updating process in dependence on at least one state of a state machine. To this end, processor 70 may run a computer program with program code for operating a determining process that comprises determining whether information useable in a generating/updating process shall be discarded or made available to the generating/updating process in dependence on at least one state of a state machine. This computer program may for instance be stored in program memory 73, which may be fixedly attached in apparatus 7 or may be a removable memory. Main memory 74 is used by processor 70 as a working memory, for instance to store intermediate results and variables.

Input interface 71 may for instance be configured to receive information useable in a generating/updating process. It may further be configured to receive states of the state machine.

Output interface 72 may for instance be configured to output the information that is determined to be made available to the generating/updating process.

Figure 12:
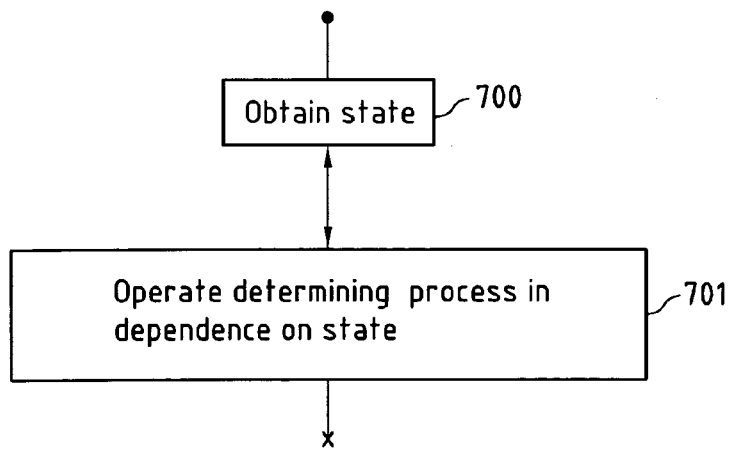
FIG. 12: a flowchart of an exemplary embodiment of a method related to determining whether information shall be discarded or not according to the present invention.

FIG. 12 is a flowchart of a further exemplary embodiment of a method according to the present invention. This flowchart may for instance be implemented as a computer program that is stored in program memory 73 of apparatus (see FIG. 11) and executed by processor 70 of apparatus 7.

In a first step 700, a state of a state machine is obtained. This may for instance be accomplished via input interface 71 of apparatus 7 (see FIG. 11).

In a second step 701, a determining process is then operated in dependence on the obtained state.

Returning to FIG. 11, processor 70 may for instance at least partially implement functionality of FPFR block 11 of FIG. 1. The information received via input interface 71 may then for instance be fingerprints and/or reports from the data collectors 10 of system 1 (see FIG. 1) or from a unit that receives the fingerprints or reports from the data collectors 10. The information may further comprise information from SDB 12, such as for instance pre-models, monitor boxes, states of the state machine and/or determination rules. The information may further comprise RDB queries received from RDB 13.

Similarly, output interface 72 may then for example output information such as reports that are made available to RDB 13 to be considered by the RMG process (in RMG block 14 of FIG. 1).

Processor 70 of apparatus 7 (see FIG. 11) may be further configured to implement further functions of FPFR block 11 of the system of FIG. 1, for instance splitting fingerprints into base-station-specific reports, checking if reports/terminal positions fall into monitor boxes (as will be explained in more detail below), and performing RDB queries, to name but a few examples.

Processor 70 may also be further configured to implement some or all of the functionality of RMG block 14 (see FIG. 1) of system 1 of FIG. 1, e.g. the RMG process (i.e. for instance generating one or more polygons to represent a plurality of reports (and the coverage area), deriving coverage models and/or pre-models form the one or more polygons), and/or the operation of the state machine (for instance setting states and controlling state transitions) and at least a part of the monitoring process (for instance detecting potential outliers (as will be explained in more detail below) and/or setting monitoring states), to name but a few examples.

Accordingly, depending on the functionalities implemented by processor 70, input interface 71 then may further be configured to receive reports from RDB 13, and output interface 72 then may be further configured to output at least one of the following: reduced reports/terminal positions to RDB 13, coverage models to RMDB 15, and pre-models, states of the state machine and monitor boxes to SDB 12.

Optional mass storage 75 of apparatus 7 may for instance be configured to implement one or more of RDB 13, SDB 12 and RMDB 15. Depending on the amount of functionality implemented by processor 70 and on the number and choice of databases (RDB, SDB, RMDB) implemented by mass storage 75, it is then readily clear for a person skilled in the art for the transfer of which kind of information input interface 71, output interface 72 and the connection between processor 70 and mass storage 75 have to be configured.

Figure 13:
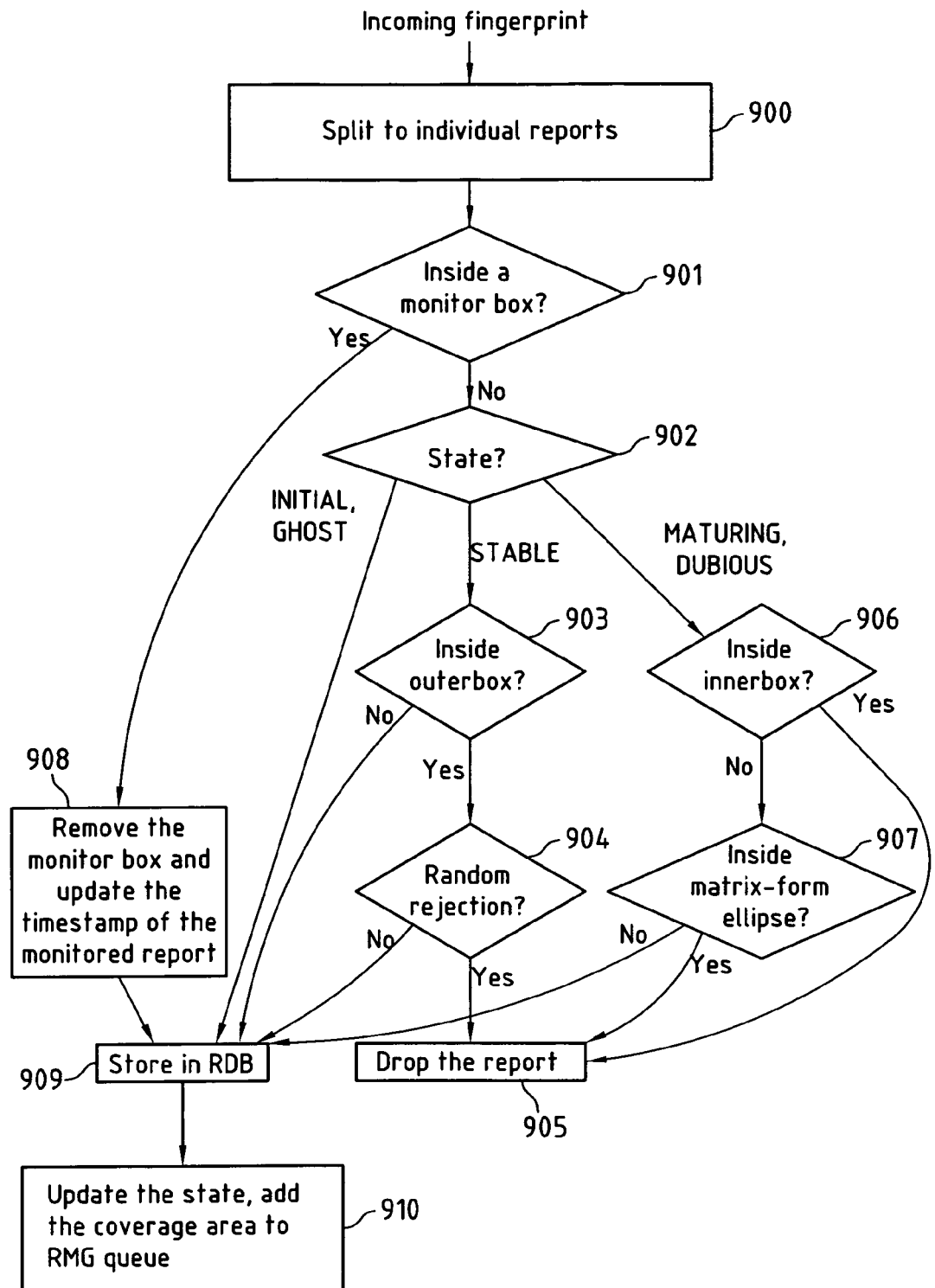
FIG. 13: a flowchart of an exemplary determining process related to determining whether information shall be discarded or not according to the present invention.

FIG. 13 is a flowchart of an exemplary method for screening fingerprints according to the present invention, comprising an example of a determining process that is operated according to a state machine. Therein, a couple of determining rules are used to decide if reports shall be discarded or made available to the RMG process. Each determining rule is assigned to one or more states of the state machine.

In step 900 of FIG. 13, fingerprints received from data collecting terminals 10 of system 1 (see FIG. 1) are first split into individual (base-station-specific) reports.

If the report is within a monitor box (step 901), which will be explained in further detail below, the monitor box is removed (step 908), the timestamp of the monitored report is updated (step 908), and the report is stored in RDB 13 of FIG. 1 (step 909). It is seen that, in this exemplary example, the checking whether a position is within a monitor box is independent of the state. This may be one possible way to ensure that the collection-state specific discarding of reports does not interfere with the monitoring process.

Otherwise, a processing according to the state of the state machine (as for instance obtained in step 700 of the flowchart of FIG. 12) is executed (see step 902).

The exemplary states used in FIG. 13 are:
1. INITIAL: The determination rule here is to store all reports that are in the RDB 13 (see step 909). This state is used when models are generated for new coverage areas and such coverage areas that gather very little traffic, i.e. when a coverage model has not been (successfully) generated yet.
2. MATURING: Used when a valid coverage model has already been generated by the RMG process, but is not considered to be based on enough reports yet. The determination rule here is as follows:
   Drop reports inside the inner box 25 (see FIG. 6), which may be about 50%-90% of the incoming data (see steps 906 and 905) and, (if not low on computation power) drop also reports inside the pre-model (matrix-form) ellipse (see FIG. 2), see steps 907 and 905.
3. STABLE: Used when the coverage model for the coverage area is believed to be correct. The determination rule is as follows:
   If a report is outside the outer box 24 (see FIG. 6), store it, see step 903; otherwise, drop the report with a random chance (see step 904), for instance with 99% or 99.9% (for instance by generating a random number between 0 and 1, and dropping the report if the number is smaller than 0.99 or 0.999).
   This will quickly discard most of the incoming reports, but may still allow to eventually detect if the coverage area changes (based on the positions that are not randomly rejected).

4. DUBIOUS: More than one (for instance more than a pre-defined number of) potential outlier has occurred, the true location of the coverage area is not readily clear. The same determination rule as in the MATURING state is used.
5. GHOST: Used to characterize a state of a model whose reports (if any) have all expired and no new reports have been received since. The last known coverage model (e.g. an ellipse) is still kept in the RMDB 15. If any new reports with respect to the coverage area of this base station arrive, reinitialize it and put it to INITIAL state. The determination rule is then the same as in the INITIAL state.

In the flowchart of FIG. 13, there may for instance be a further state DO NOT COLLECT, which causes a dropping of the report (step 905) without any further checks. This state may for instance be entered when the coverage model is considered to be complete and no further changes in the coverage area are expected.

In the flowchart of FIG. 13, at least steps 902-907 and 909 can be considered as a determining process operated according to at least one state of a state machine. This determining process constitutes an example of step 701 of the flowchart of FIG. 12 and may for instance be performed by processor 70 of apparatus 7 (see FIG. 11).

In step 909 of the flowchart of FIG. 13, storage of reports in the RDB 13 triggers checking if the collection state of the coverage area has to be updated, and adding of the coverage area to an RMG queue to cause the reports to be considered by the RMG process, see step 910. Thus any changes in a coverage area cause it to be put into the RMG queue and considered by the RMG process.

The RMG process is run for each coverage area found in the RMG queue for generation of one or more polygons, of coverage models and of pre-models as already described above, so these models are accordingly recalculated (updated). There may be precautions taken to ensure that a coverage area does not appear in the queue multiple times, as it could for instance happen with high-traffic coverage areas.

A further example of a process operated according to at least one state of a state machine according to the present invention is the monitoring process performed in the exemplary system of FIG. 1.

Figure 14:
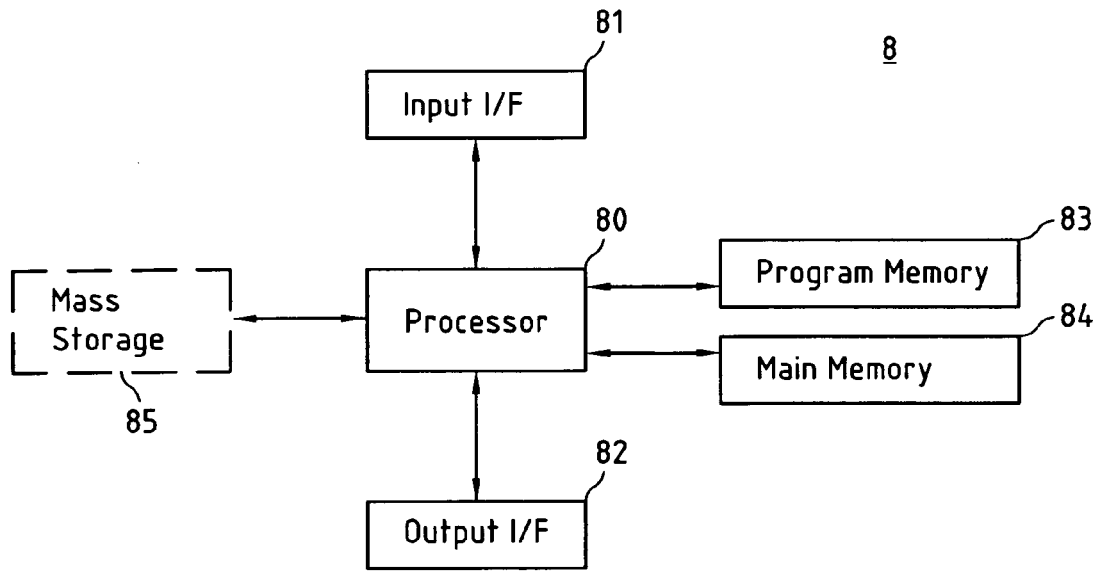
FIG. 14: a schematic block diagram of an exemplary embodiment of an apparatus related to monitoring according to the present invention.

Accordingly, FIG. 14 is a schematic illustration of an exemplary embodiment of an apparatus 8 according to the present invention. The apparatus 8 comprises a processor 80, which communicates with input interface 81, output interface 82, program memory 83 and main memory 85. Optionally, there may exist a mass storage 85 in apparatus 8.

Processor 80 is configured to operate a monitoring process that monitors a stability and/or an actuality of at least one model for a coverage area of a base station produced by the generating/updating process in dependence on at least one state of a state machine. To this end, processor 80 may run a computer program with program code for operating a monitoring process that monitors a stability and/or an actuality of at least one model for a coverage area of a base station produced by the generating/updating process in dependence on at least one state of a state machine. This computer program may for instance be stored in program memory 83, which may be fixedly attached in apparatus 8 or may be a removable memory. Main memory 84 is used by processor 80 as a working memory, for instance to store intermediate results and variables.

Input interface 81 may for instance be configured to receive information useable in the monitoring process. It may further be configured to receive states of the state machine.

Output interface 72 may for instance be configured to output results of the monitoring process.

Figure 15:
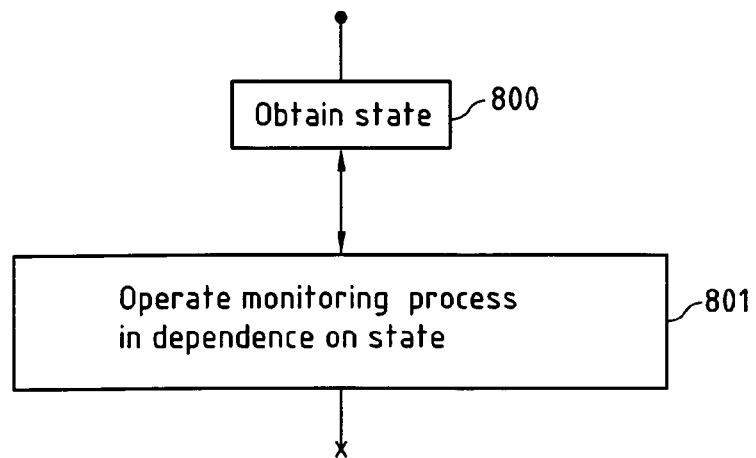
FIG. 15: a flowchart of an exemplary embodiment of a method according to the present invention.

FIG. 15 is a flowchart of a further exemplary embodiment of a method according to the present invention. This flowchart may for instance be implemented as a computer program that is stored in program memory 83 of apparatus (see FIG. 14) and executed by processor 80 of apparatus 8.

In a first step 800, a state of a state machine is obtained. This may for instance be accomplished via input interface 81 of apparatus 8 (see FIG. 14).

In a second step 801, a monitoring process is then operated in dependence on the obtained state.

Returning to FIG. 14, processor 80 may for instance be configured to implement a monitoring process (MON) for the exemplary system of FIG. 1 that keeps running (e.g. continuously, or periodically, or in response to a trigger event) through the reports stored in RDB 13 (representing the coverage area in—for instance—polygonal form) and puts reports with too old timestamps into monitoring mode.

When a report is suspected to be outdated, which may for instance be checked based on a timestamp that is assigned to the report when it is received (e.g. in FPFR block 11 or RDB 13), it may be put into monitoring mode. A monitor box (for instance with a pre-defined width and height) may be spanned around it with an expiry timestamp some time in the future, and any new reports hitting the box (see step 901 of FIG. 13) may cause the monitor box to be removed and the corresponding report's timestamp updated to current time (see step 908 in FIG. 13). The timestamp associated with a report therefore indicates when was the last time that there was a report from (the vicinity) of that position. If no reports fall inside the monitor box during this time, the report may be removed.

The width of the monitor box used if a report is in monitoring mode may for instance depend on the size of the coverage area, and/or the rate of incoming measurements.

If a coverage area has any reports in monitoring mode, they may be checked first (see for instance step 901 of FIG. 13) without any state-dependent filtering, so the state of the state machine does not affect monitoring.

The following steps represent an example of a monitoring process (MON) operated in dependence on a state machine according to step 801 of FIG. 15. This monitoring process keeps iterating through all coverage areas. Once again, the state machine is considered to have the exemplary INITIAL, MATURING, STABLE, DUBIOUS and GHOST states.

For each coverage area:
1. If any monitor box is past its expiry time, remove it and the associated report, and put the coverage area associated with the removed report into the RMG queue (to cause generation of accordingly adapted coverage/pre-models).
2. If there are no reports for a coverage area (for instance due to the removal of one or more reports in step 1), set the state to GHOST.
3. If the state is GHOST and the SDB timestamp (when the pre-models were last modified) is more than a pre-defined duration of time old, remove the coverage area from the system (for instance by deleting any entries related to the coverage area in SDB 12, RDB 12 and RMDB 15).
4. If any reports associated with a coverage area are older than a pre-defined duration of time and not already monitored, create monitoring boxes for them with a pre-defined expiry time in future, and put the coverage area into the RMG queue (for instance since it may be desired that the pre-models are based on non-monitored reports only, see step 305 of FIG. 7).

5. If the state is COLLECTING and the SDB timestamp (when the pre-models were last modified) is older than a pre-defined duration of time and the coverage area is not in the RMG queue, set the state to STABLE.

Therein, it is seen that some steps (the numbering of which does not imply a certain sequence of the steps) of the above monitoring process (also) cause transitions of the state machine (for instance steps 2 and 5), which will be explained further with reference to FIG. 16 below. At least step 3 can be considered to be performed in dependence on a state of the state machine, since a coverage area with an SDB timestamp that is more than a pre-defined duration of time old is only removed if the state is GHOST (whereas, if the state would be STABLE, the coverage area would not be removed).

If processor 80 of apparatus 8 (see FIG. 14) is configured to implement the above described exemplary monitoring process, input interface 81 may be configured to receive states of the state machine, timestamps of the pre-models and monitoring boxes and their associated expiry timestamps from SDB 12, and reports (and their associated timestamps) stored to represent a coverage area in RDB 13. Output interface 82 may then be configured to output states of the state machine and monitoring boxes and their associated expiry timestamps to SDB 12, to output a signal that causes removal of reports of a coverage area in RDB 13, and to output a signal to put a coverage area into the RMG queue.

Processor 80 may for instance be co-located or even identical with a processor that implements the FPFR block 11 in the system of FIG. 1. Equally well, processor 80 may be co-located or even identical with a processor that implements the RMG block 14 of the system of FIG. 1. The functionalities of the input interface 81 and of the output interface 82 are then adapted accordingly, as it is readily clear for a person skilled in the art.

Furthermore, optional mass storage 85 of apparatus 8 may for instance implement SDB 12 and/or the RDB 13, and then the access of processor 80 to the information stored in SDB 12 and RDB 13 would take place via the connection between processor 80 and mass storage 85.

Processor 80 may for instance be a processor that jointly implements the functionality of FPFR block 11, RMG block 14 and implements the monitoring process as described above. Processor 80 may then also implement the outlier detection process described in further detail below.

According to the exemplary system of FIG. 1, the concept of putting reports into monitoring mode by setting up monitoring boxes is not only used when reports are suspected by the monitoring process (MON) to be outdated, but also when an outlier detection process considers a report to represent a potential outlier.

The outlier detection process will now be described in further detail with respect to the exemplary system of FIG. 1. Therein, it is exemplarily assumed that the outlier detection process is a part of the RMG process (alternatively, the outlier detection process may be a stand-alone process). It is further noted that the following exemplary embodiment of the outlier detection algorithm does not depend on the states of the state machine, but this is however not binding.

The outlier detection process checks new reports (for instance new reports in the RDB 13) against the old coverage area estimates (for instance based on existing pre-models) and puts suspected outliers (for instance reports with positions with a distance to the pre-model(s) that is above a pre-defined threshold) directly into monitoring with a pre-defined expiry time, which may for instance be shorter than the expiry time used for reports suspected to be outdated by monitoring.

It should be noted that there is no differentiation in the treatment of the report for which the monitoring box has been set up as to whether the monitoring box was set up by the monitoring process (MON) or the outlier detection process.

As already explained with reference to steps 303 and 304 of FIG. 7, when a coverage area has reports in monitoring mode, the RMG stores, in addition to the polygon of all reports, also the vertices of a polygon only from non-monitored reports. This way, in a case of suspected outliers, the optimal polygons both including and excluding the monitored reports can be maintained. This arrangement may ensure that if some of the monitored vertices are removed, there are vertices in reserve (i.e. vertices in the vicinity of the monitored vertices that are not discarded in screening since the pre-models used in screening are based on the non-monitored polygon) to produce a good coverage model.

Single potential outliers are put in monitoring so that they disappear quickly unless they are verified by new reports.

In case of multiple potential outliers from different terminals (or, because it may not be possible to distinguish between terminals, having different timestamps, i.e. coming from different upload batches, wherein it is exemplarily assumed that all reports arriving in the same upload batch from a data collector 10 get the same timestamp), all the vertices of the polygon are put in monitoring and the coverage area is set to DUBIOUS state, so that either the old positions or the new positions are quickly verified and the obsolete ones expire away.

Figure 16:
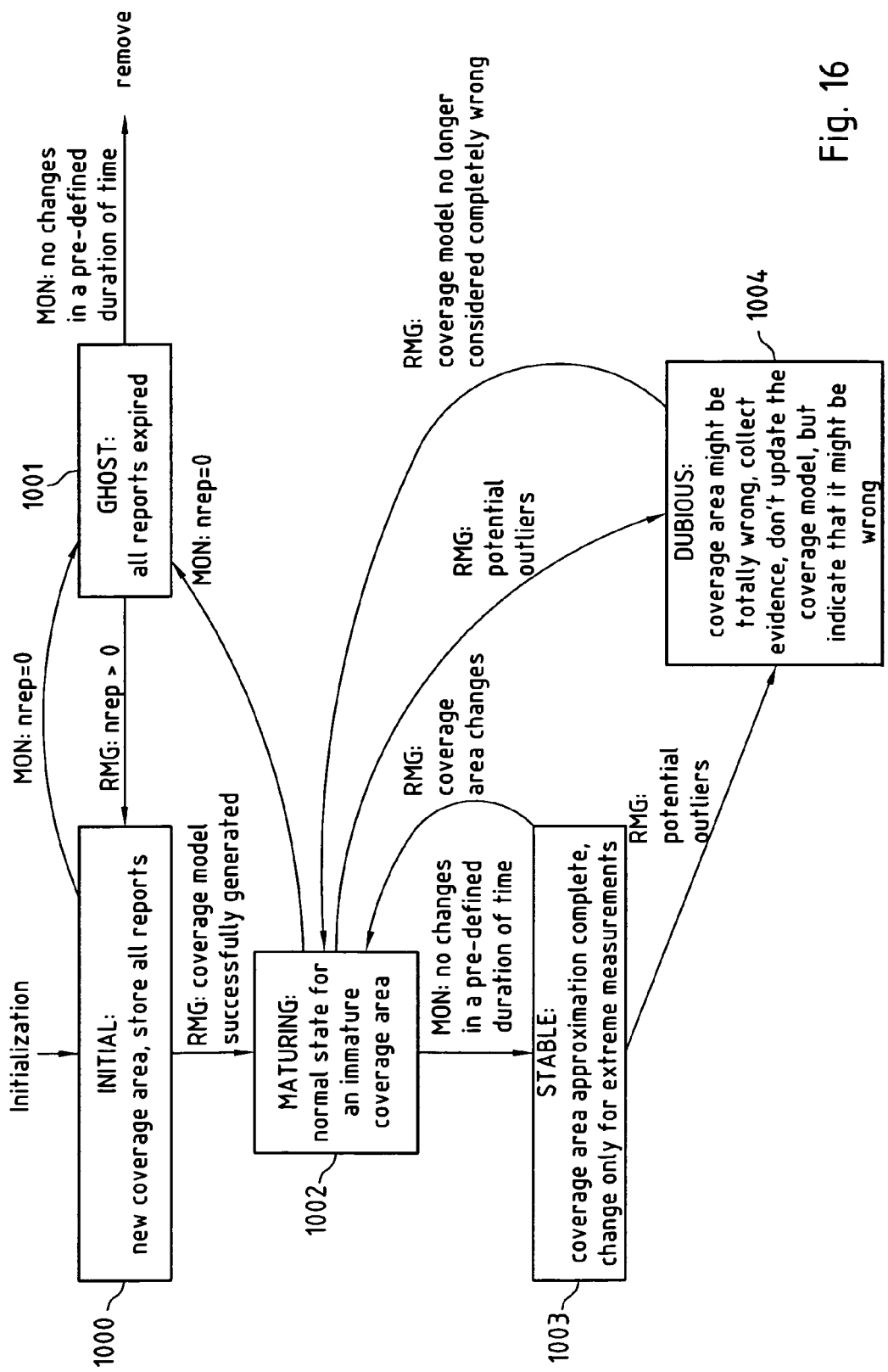
FIG. 16: an exemplary state transition diagram for exemplary states of a state machine according to the present invention.

FIG. 16 illustrates an exemplary state transition diagram for an exemplary state machine according to the present invention. This state machine is exemplarily assumed to be associated with the coverage model generated by the RMG process, i.e. the states of the state machine correspond to the states of the coverage model with respect to the generating/updating of the coverage model. As already discussed above, exemplary states of this state diagram are INITIAL, MATURING, STABLE, DUBIOUS and GHOST. FIG. 16 also shows the events from the MON and RMG processes that partially trigger the state transitions (wherein it is exemplarily assumed that the outlier detection process is part of the RMG process). In the exemplary system of FIG. 1, the current state of the state machine for each coverage area is stored in SDB 12. Initialization of the state transition diagram of FIG. 16 leads to the INITIAL state 1000, i.e. there is a coverage model for a new coverage area to be determined, and all incoming reports are stored. If the monitoring process reveals that there are no reports for the coverage area (for instance since all reports (if any) forming the polygonal representation had to be removed due to lack of hits of the monitor boxes), the state associated with this coverage area is changed to GHOST 1001, i.e. there are no reports or all reports expired. If the state is GHOST 1001, and the monitoring process turns out that no changes occur in a pre-defined duration of time, all information pertaining to this coverage area is removed.

If the state is INITIAL 1000, and RMG reports that an elliptical coverage model (exemplarily assumed here) has been generated (see step 404 of FIG. 10), the new state is MATURING 1002. If the monitoring process now turns out that there are no changes within a pre-defined duration of time, the state is changed to STABLE 1003, and it is only changed back to MATURING 1002 in case that the RMG process informs on changes in the coverage area.

Furthermore, if the state is STABLE 1003, and the RMG process (or the outlier detection process, if it is not part of the RMG process) informs that there are potential outliers, the state is changed to DUBIOUS 1004. The same information causes also a transition from state MATURING 1002 to state DUBIOUS 1004.

In state DUBIOUS 1004, the coverage model is marked as dubious, but is not updated (in RMDB 15) with the potential outliers. From the DUBIOUS state 1004, a transition to state MATURING 1002 is possible if the RMG process reports that the coverage model longer appears to be completely wrong (for instance because the assumed coverage area passed one or more sanity checks).

In the following, principles of the exemplary fingerprint collection system of FIG. 1 will be described with reference to exemplary use cases.

New Coverage Area

The first fingerprint/report from a new coverage area causes RMG block 13 to create a new entry in SDB 12 for that coverage area. The coverage area starts in INITIAL state 1000 (see FIG. 16) in which no reports are discarded (see FIG. 13). Each incoming report causes the RMG to be run.

Once a successful coverage model (e.g. an ellipse) has been generated, RMG puts the state to MATURING 1002 (see FIG. 16) and screening with pre-models begins (see FIG. 13). After the coverage area approximation has stopped growing, it eventually goes into STABLE state 1003 (see FIG. 16).

Normal Operation

This is when the coverage area approximation is correct and the system operates normally (should be about 99.9% of the time).

The state of the state machine for the coverage area is STABLE 1003 (see FIG. 16). Because most of the incoming reports are thrown away in screening (save for the, for instance, 1% or 0.1% that pass through the random rejection, see step 904 of FIG. 13), the vertices will go into monitoring mode now and then, but as the model is about correct and there is traffic in the coverage area, some report will hit the monitor box and the vertex's timestamp is updated. The coverage model (e.g. an ellipse) stays untouched in this case.

Occasionally some terminal's GNSS may be a bit off and it reports a point that is significantly outside the coverage area approximation. This report is outside the outerbox (see step 903 in FIG. 13) and thus passes to RMG. It is tagged as a potential outlier there and put on a short monitoring period of pre-defined duration. The coverage model (e.g. an ellipse) will temporarily expand to include also this point (see steps 303, 304 in FIG. 7), and the state drops into the MATURING state 1002 (see FIG. 16), but the coverage model will snap back to its former form after the outlying report expires, and back to STABLE state 1003 (see FIG. 16) after sufficient time passes without new potential outliers.

Disappearing Coverage Area

If a coverage area suddenly ceases to be (for instance due to base station removal or turn-off, to name but a few possibilities), there will not be any more reports featuring it, and all of its reports will expire in time. When the last report is removed, MON sets the state to GHOST 1001 (see FIG. 16). If there still are no reports within a pre-defined duration of time, MON removes all information related to the coverage area from the database.

Temporarily Disappearing Coverage Area

Same as previous case, except when the state is GHOST 1001 (see FIG. 16), it comes back to life (INITIAL state 1000 in FIG. 16) as soon as new fingerprints/reports start to come in. The first arriving fingerprint/report triggers RMG to be ran for the coverage area, and as there are no old reports in the database, the data collection is started just as if the coverage area was a new one.

Expanding Coverage Area

A state for a coverage area is STABLE 1003 (see FIG. 16), but then the coverage area is increased for example because of increase in transmit power. Now there will be new reports coming from the newly covered region, which may at first be tagged as potential outliers, but will be verified by new reports coming in from the area. At the first change, the state drops into MATURING state 1002 (see FIG. 16), but after the new boundaries of the coverage area are found and stabilized, the state switches back to STABLE 1003.

Shrinking Coverage Area

A state for a coverage area is STABLE 1003 (see FIG. 16), but then the coverage area shrinks for example because of decrease in transmit power.

The coverage area approximation will at first stay in its former size, but as the vertices expire and go into monitoring mode, there will be no monitoring hits and the corners will eventually all be removed. Because interior points are stored when monitoring is on, the coverage area approximation does not shrink too much when removing border points. When the first vertex is removed, the state drops into MATURING 1002 (see FIG. 16) for a pre-defined duration of time, but switches back to STABLE state 1003 once the approximation has stopped shrinking.

Moved Coverage Area

A coverage area (or the ID code of its base station) is moved a large distance. Once the first fingerprint/report from the new coverage area arrives, if it is far away from the assumed coverage area (as represented by the pre-models), it is tagged as a potential outlier and, for instance after detection of several potential outliers, the state is set to DUBIOUS 1004 (see FIG. 16).

More reports arriving from the new area will support the potential outliers, which causes the RMG to put all the old vertices in a short monitoring period and eventually remove them. When all the old points are gone, the coverage area approximation may pass one or more sanity checks and the coverage area may go to MATURING state 1002 again (see the transition between states 1004 and 1002 in FIG. 16) and in time to STABLE state 1003. Note that the coverage model in RMDB 15 stays in the old position but is indicated to be potentially wrong.

It should be noted that some or all of the states of FIG. 16 and potential further states may also be applied at system level (i.e. for instance independent from a specific coverage area). With respect to the determining process of FIGS. 13 and 14, the whole system 1 of FIG. 1 may for instance be set into, say, INITIAL mode indicating that all reports shall be maintained regardless of other aspects. Such a mode may be set, for example, after a reset of RDB 13. Similarly, also a BUSY mode may be assigned. In such a mode, reports might be dropped randomly, for example. The system or parts thereof may also be set to DO NOT COLLECT state to avoid collection of reports. This may for instance be performed for the base stations of a specific operator due to business or legal reasons.

Figure 17:
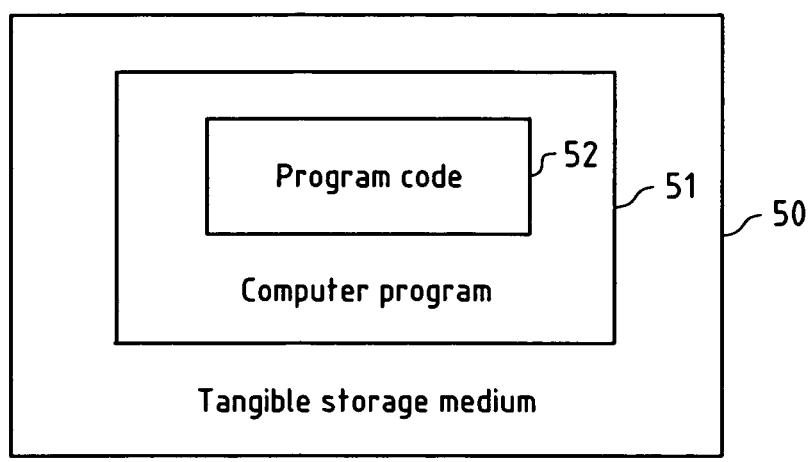
FIG. 17: a schematic illustration of an exemplary embodiment of a tangible storage medium according to the present invention.

FIG. 17 is schematic illustration of an exemplary embodiment of a tangible storage medium 50 according to the present invention. Tangible storage medium 50 may for instance store a computer program 51 with program code 52 for operating a generating/updating process (as for instance in FIG. 9) that comprises generating and/or updating at least one model for a coverage area of a base station and/or at least one process associated with the generating/updating process in dependence on at least one state of a state machine. The at least one process associated with the generating/updating process may for instance be an information providing process (as for instance in FIG. 5), a position determining process (as for instance in FIG. 3), a monitoring process (as for instance in FIG. 15) and/or a determining process (as for instance in FIG. 12). Tangible storage medium 50 is a readable medium, for instance a computer-readable or processor-readable medium. Accordingly, the computer program 51 stored on tangible storage medium 50 may be executable by a computer or a processor. Tangible storage medium 50 may for instance be embodied as an electric, magnetic, electro-magnetic, optic or other tangible storage medium, and may either be a removable medium or a medium that is fixedly installed in an apparatus or device, such as for instance apparatus 3 of FIG. 2, apparatus 4 of FIG. 4, apparatus 6 of FIG. 8, apparatus 7 of FIG. 11 or apparatus 8 of FIG. 14.

The following appendix describes exemplary algorithmic details of the present invention and is to be understood as part of the disclosure.

APPENDIX A.1

Coordinate and Ellipse Conversions

Straight lines on Earth are defined as those following the great circles (i.e. the circles on the surface of the earth dividing the Earth into two equal hemisphere so that the centre of the Earth lies on the plane defined by the great circles), and there is a difference between them and the straight lines in geodetic coordinates. These are luckily negligible for small coverage areas. At latitudes less than 80°, this error is less than 3 m for coverage areas with 5 km diameter, and less than 150 m for coverage area with 35 km diameter.

At latitude $\phi$, the length of one meter in East/North directions in degrees is:

$$s_E(\phi) = \frac{180}{\pi} \frac{\sqrt{1-e^2\sin(\phi)^2}}{a\cos(\phi)} \; °/m$$

$$s_N(\phi) = \frac{180}{\pi} \frac{(1-e^2\sin(\phi)^2)^{\frac{3}{2}}}{a(1-e^2)} \; °/m$$

where a and e are the WGS-84 semi-major axis and eccentricity of Earth.

Then a local conversion from 2D geodetic coordinates ($\phi$, $\lambda$) to Cartesian East-North coordinates (x, y) with origin at ($\phi_0$, $\lambda_0$) is $$\begin{bmatrix} x \\ y \end{bmatrix} = M \begin{bmatrix} \phi - \phi_0 \\ \lambda - \lambda_0 \end{bmatrix} \quad (1)$$

where $$M = \begin{bmatrix} 0 & s_E^{-1}(\phi_0) \\ s_N^{-1}(\phi_0) & 0 \end{bmatrix},$$

Conversion Between Axis/Angle-Form and Matrix-Form Ellipses

The centers of the axis/angle-form and matrix-form ellipses are the same. Given an axis/angle-form ellipse with semi-axes with radii $r_1$ and $r_2$ (in meters), and clock-wise angle $\theta$ between first semiaxis and North, the corresponding matrix form is $$A = M^T \begin{bmatrix} \sin(\theta) & \cos(\theta) \\ \cos(\theta) & -\sin(\theta) \end{bmatrix} \begin{bmatrix} r_1^{-2} & 0 \\ 0 & r_2^{-2} \end{bmatrix} \begin{bmatrix} \sin(\theta) & \cos(\theta) \\ \cos(\theta) & -\sin(\theta) \end{bmatrix} M. \quad (2)$$

Conversely, given the matrix A, the corresponding semi-axis lengths and rotation angle of the 3GPP ellipse are $$r_1 = \sqrt{\text{first eigenvalue of } MA^{-1}M^T}$$

$$r_2 = \sqrt{\text{second eigenvalue of } MA^{-1}M^T}$$

$$\theta = a\tan 2(v_1, v_2)$$

where v is the eigenvector of $MA^{-1}M^T$ corresponding to its first eigenvalue, and the a tan 2-function denotes the arc tangent taking the quadrants into account.

It is readily clear for a person skilled in the art that the logical blocks in the schematic block diagrams as well as the flowchart and algorithm steps presented in the above description and its appendices may at least partially be implemented in electronic hardware and/or computer software, wherein it may depend on the functionality of the logical block, flowchart step and algorithm step and on design constraints imposed on the respective devices to which degree a logical block, a flowchart step or algorithm step is implemented in hardware or software. The presented logical blocks, flowchart steps and algorithm steps may for instance be implemented in one or more digital signal processors (DSPs), application specific integrated circuits (ASICs), field programmable gate arrays (FPGAs) or other programmable devices. The computer software may be stored in a variety of computer-readable storage media of electric, magnetic, electro-magnetic or optic type and may be read and executed by a processor, such as for instance a microprocessor. To this end, the processor and the storage medium may be coupled to interchange information, or the storage medium may be included in the processor.

The invention has been described above by means of embodiments, which shall be understood to be exemplary and non-limiting. In particular, it should be noted that there are alternative ways and variations which are obvious to a skilled person in the art and can be implemented without deviating from the scope and spirit of the appended claims. It should also be understood that the sequence of all method steps presented above is not mandatory, also alternative sequences may be possible.

The invention claimed is:

1. An apparatus comprising:
   a processor, and
   a memory, said memory storing a program comprising program code, said program configured to cause said apparatus, when said program is executed on said processor, to operate, in dependence on at least one state of a state machine, at least one of
   a generating/updating process that comprises at least one of generating and updating at least one model for a coverage area of a communication node and
   at least one process associated with said generating/updating process wherein at least two different states of said state machine are associated with two different respective states of at least one of said at least one model for the coverage area of said communication node at least one of generated and updated by said generating/updating process, and wherein transitions between at least two states of said state machine are controlled by at least one of a monitoring process that monitors at least one of a stability and an actuality of at least one of said at least one model for said coverage area of said communication node, an outlier detection process that detects potential outliers with respect to said coverage area of said communication node and said generating/updating process.

2. The apparatus according to claim 1, wherein at least two different states of said state machine are associated with different respective information needs of said generating/updating process.

3. The apparatus according to claim 1, wherein transitions between at least two states of said state machine are triggered by events related to at least one property of at least one of said at least one model for said coverage area of said communication node.

4. The apparatus according to claim 3, wherein said at least one property is one of an availability, a consistency, a stability, a lack of reliability and a lack of actuality of said at least one model for said coverage area of said communication node.

5. The apparatus according to claim 1, wherein at least said generating/updating process is operated in dependence on at least one state of said state machine, and wherein in said at least one state of said state machine, generating and/or updating of at least one model of said at least one model for said coverage area of said communication node is suspended.

6. The apparatus according to claim 1, wherein at least one of said at least one process associated with said generating/updating process is at least one of:
   an information providing process of providing information useable in said generating/updating process, and wherein at least said information providing process is operated in dependence on at least one state of said state machine,
   a position determining process capable of determining a position of a terminal based on at least one of said at least one model generated and/or updated by said generating/updating process, and wherein at least said position determining process is operated in dependence on at least one state of said state machine, and
   a monitoring process that monitors at least one of a stability and an actuality of at least one of said at least one model for said coverage area of said communication node, and wherein at least said monitoring process is operated in dependence on at least one state of said state machine.

7. The apparatus according to claim 1, wherein at least one of said at least one process associated with said generating/updating process is a determining process comprising determining whether information useable for said generating/updating process shall be discarded or made available to said generating/updating process, and wherein at least said determining process is operated in dependence on at least one state of said state machine.

8. The apparatus according to claim 7, wherein said determining is based on determination rules, and wherein for at least two different states of said state machine, different respective determination rules are applied in said determining process, and wherein said different respective determination rules applied in said at least two different states lead to respectively different amounts of discarded information.

9. The apparatus according to claim 8, wherein a determination rule of said determination rules, which determination rule is applied in at least one state of said state machine, requires at least one of:
   that no information shall be discarded,
   that said information shall be discarded if a position contained in said information is covered by a first-type model for said coverage area of said communication node produced by said generating/updating process, and that said information shall be discarded if said position contained in said information is not covered by said first-type model but is covered by a second-type model for said coverage area of said communication node produced by said generating/updating process, and that said information shall be made available to said generating/updating process otherwise, and
   that said information shall be made available to said generating/updating process if a position contained in said information is not covered by a model for said coverage area of said communication node produced by said generating/updating process, and that, if said position contained in said information is covered by said model, said information shall be discarded randomly according to a pre-defined probability criterion and otherwise made available to said generating/updating process.

10. The apparatus according to claim 1, wherein said apparatus is at least one of a server, a terminal and a apparatus that further comprises at least one of a user interface, a memory and IP connectivity.

11. The apparatus according to claim 1, wherein said model for a coverage area is a geometrical model.

12. The apparatus according to claim 1, wherein at least one of said monitoring process, said outlier detection process and said generating/updating process issue events that trigger said state transitions.

13. The apparatus according to claim 1, wherein said at least one model for said coverage area for which said monitoring process monitors at least one of a stability and an actuality is said at least one model with said at least two different states respectively associated with said at least two different states of said state machine.

14. The apparatus according to claim 1, wherein said outlier detection process determines whether a position contained in information useable in said generating/updating process is to be considered as a potential outlier or not based on at least one of:
   at least one of said at least one model produced by said generating/updating process and
   pre-defined information.

15. The apparatus according to claim 1, wherein said at least one model with said at least two different states respectively associated with said at least two different states of said state machine is one of:
   a model that is used to represent positions of terminals within said generating/updating process and serves as a basis for one of some and all models at least one of generated and updated by said generating/updating process, and
   a model that is to be provided to at least one terminal to enable said terminal to perform positioning.

16. A method comprising:
operating, in dependence on at least one state of a state machine, at least one of
a generating/updating process that comprises at least one of generating and updating at least one model for a coverage area of a communication node and
at least one process associated with said generating/updating process, wherein at least two different states of said state machine are associated with two different respective states of at least one of said at least one model for the coverage area of said communication node at least one of generated and updated by said generating/updating process, and wherein transitions between at least two states of said state machine are controlled by at least one of a monitoring process that monitors at least one of a stability and an actuality of at least one of said at least one model for said coverage area of said communication node, an outlier detection process that detects potential outliers with respect to said coverage area of said communication node and said generating/updating process.

17. The method according to claim 16, wherein at least two different states of said state machine are associated with different respective information needs of said generating/updating process.

18. The method according to claim 16, wherein transitions between at least two states of said state machine are triggered by events related to at least one property of at least one of said at least one model for said coverage area of said communication node.

19. The method according to claim 16, wherein at least said generating/updating process is operated in dependence on at least one state of said state machine, and wherein in said at least one state of said state machine, generating and/or updating of at least one model of said at least one model for said coverage area of said communication node.

20. The method according to claim 16, wherein at least one of said at least one process associated with said generating/updating process is one of:
   an information providing process of providing information useable in said generating/updating process, and wherein at least said information providing process is operated in dependence on at least one state of said state machine,
   a position determining process capable of determining a position of a terminal based on at least one of said at least one model generated and/or updated by said generating/updating process, and wherein at least said position determining process is operated in dependence on at least one state of said state machine,
   a monitoring process that monitors at least one of a stability and an actuality of at least one of said at least one model for said coverage area of said communication node, and wherein at least said monitoring process is operated in dependence on at least one state of said state machine, and
   a determining process comprising determining whether information useable for said generating/updating process shall be discarded or made available to said generating/updating process, and wherein at least said determining process is operated in dependence on at least one state of said state machine.

21. A readable medium having a program comprising program code for performing the method according to claim 16, when said program is executed on a processor, stored thereon.

22. The method according to claim 16, wherein said model for a coverage area is a geometrical model.

23. The method according to claim 16, wherein at least one of said monitoring process, said outlier detection process and said generating/updating process issue events that trigger said state transitions.

24. The method according to claim 16, wherein said at least one model for said coverage area for which said monitoring process monitors at least one of a stability and an actuality is said at least one model with said at least two different states respectively associated with said at least two different states of said state machine.

25. The method according to claim 16, wherein said outlier detection process determines whether a position contained in information useable in said generating/updating process is to be considered as a potential outlier or not based on at least one of:
   at least one of said at least one model produced by said generating/updating process and
   pre-defined information.

26. The method according to claim 16, wherein said at least one model with said at least two different states respectively associated with said at least two different states of said state machine is one of:
   a model that is used to represent positions of terminals within said generating/updating process and serves as a basis for one of some and all models at least one of generated and updated by said generating/updating process, and
   a model that is to be provided to at least one terminal to enable said terminal to perform positioning.

* * * * *